(12) United States Patent
Wang et al.

(10) Patent No.: US 12,210,829 B2
(45) Date of Patent: Jan. 28, 2025

(54) ENTITY RECOGNITION METHOD, APPARATUS, ELECTRONIC DEVICE AND COMPUTER READABLE STORAGE MEDIUM

(71) Applicants: SAMSUNG ELECTRONICS CO., LTD., Suwon-si (KR); BEIJING SAMSUNG TELECOM R&D CENTER, Beijing (CN)

(72) Inventors: Huadong Wang, Beijing (CN); Ting Chen, Beijing (CN)

(73) Assignees: SAMSUNG ELECTRONICS CO., LTD., Suwon-si (KR); BEIJING SAMSUNG TELECOM R&D CENTER, Beijing (CN)

( * ) Notice: Subject to any disclaimer, the term of this patent is extended or adjusted under 35 U.S.C. 154(b) by 262 days.

(21) Appl. No.: 17/715,436

(22) Filed: Apr. 7, 2022

(65) Prior Publication Data

US 2022/0245347 A1    Aug. 4, 2022

Related U.S. Application Data

(63) Continuation of application No. PCT/KR2021/008223, filed on Jun. 30, 2021.

(30) Foreign Application Priority Data

Jul. 1, 2020 (CN) .......................... 202010628132.4
Jun. 4, 2021 (CN) .......................... 202110624434.9

(51) Int. Cl.
  *G06F 17/00*    (2019.01)
  *G06F 40/205*    (2020.01)
  *G06F 40/295*    (2020.01)

(52) U.S. Cl.
  CPC .......... *G06F 40/295* (2020.01); *G06F 40/205* (2020.01)

(58) Field of Classification Search
  None
  See application file for complete search history.

(56) References Cited

U.S. PATENT DOCUMENTS 7,216,073 B2 *  5/2007  Lavi ...................... G06F 40/284
                                                            704/9
10,303,771 B1 *  5/2019  Jezewski .................. G06N 3/04
(Continued)

FOREIGN PATENT DOCUMENTS

JP     2019-512801 A    5/2019
WO    2021/000491 A1    1/2021

OTHER PUBLICATIONS

Communication dated Oct. 13, 2021 issued by the International Searching Authority in counterpart Application No. PCT/KR2021/008223 (PCT/ISA/220, PCT/ISA/210, and PCT/ISA/237).

(Continued)

*Primary Examiner* — Satwant K Singh
(74) *Attorney, Agent, or Firm* — Sughrue Mion, PLLC

(57) ABSTRACT

An entity recognition method, apparatus, electronic device, and computer-readable storage medium are provided. The method includes: determining at least one entity boundary word corresponding to a text sequence; determining at least one entity candidate region in the text sequence based on the at least one entity boundary word; and performing entity recognition on the text sequence and identifying at least one entity in the text sequence based on the at least one entity candidate region.

14 Claims, 25 Drawing Sheets

(56) References Cited

U.S. PATENT DOCUMENTS

| | | | |
|---|---|---|---|
| 10,489,512 B2* | 11/2019 | Jezewski | G06F 40/30 |
| 2006/0015484 A1 | 1/2006 | Weng et al. | |
| 2009/0249182 A1 | 10/2009 | Symington et al. | |
| 2016/0335234 A1 | 11/2016 | Baker et al. | |
| 2016/0335341 A1 | 11/2016 | Krauss | |
| 2019/0354582 A1* | 11/2019 | Schäfer | G06V 10/82 |
| 2019/0354886 A1 | 11/2019 | Huang et al. | |
| 2020/0117710 A1 | 4/2020 | Okura et al. | |

OTHER PUBLICATIONS

Congying Xia et al., "Multi-Grained Named Entity Recognition", Proceedings of the 57th Annual Meeting of the Association for Computational Linguistics, 2019, 11 pages total.

* cited by examiner

Proposal1: t1 t2 [t3] t4 t5 t6
Proposal2: t1 t2 [t3 t4] t5 t6
Proposal3: t1 [t2 t3 t4] t5 t6
Proposal4: t1 [t2 t3 t4 t5] t6
Proposal5: [t1 t2 t3 t4 t5] t6
Proposal6: [t1 t2 t3 t4 t5 t6]

<RELATED ART>

<RELATED ART>

Proposal1: t1 t2 [t3] t4 t5
Proposal2: t1 [t2 t3 t4] t5
Proposal3: [t1 t2 t3 t4 t5]

<RELATED ART>

(1) Naive Start & End Boundary Attention (2) Fast & Memory-efficient start & end Boundary Attention

ENTITY RECOGNITION METHOD, APPARATUS, ELECTRONIC DEVICE AND COMPUTER READABLE STORAGE MEDIUM

CROSS-REFERENCE TO RELATED APPLICATION(S)

This application is a continuation application of International Application No. PCT/KR2021/008223, filed on Jun. 30, 2021, in the Korean Intellectual Property Receiving Office and claiming priorities to Chinese Patent Application No. 202010628132.4, filed on Jul. 1, 2020, in the China National Intellectual Property Administration, and Chinese Patent Application No. 202110624434.9, filed on Jun. 4, 2021, in the China National Intellectual Property Administration, the disclosures of which are incorporated by reference herein in their entireties.

BACKGROUND

1. Field

The present disclosure relates to the field of computer technologies, in particular to an entity recognition method, an apparatus, an electronic device and a computer readable storage medium.

2. Description of the Related Art

The main purpose of entity recognition is to extract all candidate entities that may be entities from a text sequence to be recognized, and to determine entity categories.

Nested entity recognition means that entities in a text sequence to be recognized may be nested. Nested entity recognition requires the recognition of all candidate entities in an input text sequence, not just outermost candidate entities. In the conventional sequence-based annotation methods, each word may be assigned with one label, and therefore, it is necessary to optimize entity recognition methods.

SUMMARY

One or more example embodiments of the disclosure is to solve at least one of the technical defects in the related art. The present disclosure provides an entity recognition method, apparatus, electronic device, and computer-readable storage medium, in which a rate (or a probability) of an entity candidate region covering entities in a text sequence to be recognized may be increased, without increasing a number of entity candidate regions, thereby decreasing complexity for calculation.

According to an aspect of an example embodiment of the disclosure, provided is an entity recognition method, including: determining at least one entity boundary word corresponding to a text sequence; determining at least one entity candidate region in the text sequence based on the at least one entity boundary word; and performing entity recognition on the text sequence and identifying at least one entity in the text sequence based on the at least one entity candidate region.

According to an aspect of an example embodiment of the disclosure, an entity recognition method is provided, which includes: acquiring at least one entity boundary word corresponding to a text sequence to be recognized; acquiring at least one entity candidate region in the text sequence to be recognized based on the at least one entity boundary word; and acquiring entity recognition result for the text sequence to be recognized based on the at least one entity candidate region.

In an embodiment of the present disclosure, the acquiring the at least one entity boundary word corresponding to the text sequence to be recognized, includes: using all words in the text sequence to be recognized, as entity boundary words; or based on a context representation vector of a word in the text sequence to be recognized, acquiring a probability of the word in the text sequence to be recognized being used as the entity boundary word, and based on the probability, determining the entity boundary word of the text sequence to be recognized.

In an embodiment of the present disclosure, the acquiring the at least one entity candidate region in the text sequence to be recognized based on the at least one entity boundary word includes: acquiring an entity proposal region corresponding to the text sequence to be recognized based on the entity boundary word; and acquiring corresponding entity candidate region based on the entity proposal region.

In an embodiment of the present disclosure, the acquiring the entity proposal region corresponding to the text sequence to be recognized based on the entity boundary word includes: based on at least one preset width, using the entity boundary word respectively as an anchor word to acquire corresponding entity proposal region.

In an embodiment of the present disclosure, the acquiring the corresponding entity candidate region based on the entity proposal region includes: acquiring a corresponding combination vector based on the context representation vector of a word covered by the entity proposal region and a context representation vector of the corresponding anchor word; acquiring similarity between the context representation vector of the entity boundary word in the text sequence to be recognized and the combined vector; and acquiring the corresponding entity candidate region based on the similarity.

In an embodiment of the present disclosure, the acquiring the similarity between the context representation vector of the entity boundary word in the text sequence to be recognized and the combined vector includes: acquiring similarity between the context representation vector of the entity boundary word in the text sequence to be recognized and the combined vector in Euclidean space or hyperbolic space.

In an embodiment of the present disclosure, the acquiring the corresponding entity candidate region based on the similarity includes: based on the similarity, determining a start boundary word of the corresponding entity candidate region from among the anchor word of the entity proposal region in the text sequence to be recognized and the entity boundary word located on the left side of the anchor word, and determining an end boundary word of the corresponding entity candidate region from among the anchor word of the entity proposal region in the text sequence to be recognized and the entity boundary word located on the right side of the anchor word; and determining the corresponding entity candidate region based on the start boundary word and the end boundary word.

In an embodiment of the present disclosure, the acquiring the corresponding combination vector based on the context representation vector of a word covered by the entity proposal region and a context representation vector of the corresponding anchor word includes: obtaining a corresponding feature vector, by setting a width of the entity proposal region as convolution kernel width and performing convolution processing on the context representation vector for the word covered by the entity proposal region; and acquiring the corresponding combination vector based on a feature vector corresponding to a word covered by the entity proposal region and a context representation vector of the corresponding anchor word.

In an embodiment of the present disclosure, the acquiring the corresponding entity candidate region based on the entity proposal region includes: determining at least one start boundary word candidate and at least one end boundary word candidate for the anchor word of the entity proposal region; determining the start boundary word of the entity proposal region from among the at least one start boundary word candidate, and the end boundary word of the entity proposal region from among the at least one end boundary word candidate; and determining the corresponding entity candidate region based on the obtained start boundary word and end boundary word.

In an embodiment of the present disclosure, the determining the at least one start boundary word candidate and the at least one end boundary word candidate for the anchor word of the entity proposal region includes: determining the anchor word of the entity proposal region and the entity boundary word located on the left side of the anchor word as the at least one start boundary word candidate for the anchor word; and determining the anchor word of the entity proposal region and the entity boundary word located on the right side of the anchor word as the at least one end boundary word candidate for the anchor word.

In an embodiment of the present disclosure, the determining the start boundary word of the entity proposal region from among the at least one start boundary word candidate, and the end boundary word of the entity proposal region from among the at least one end boundary word candidate includes: determining a first probability of each of the at least one start boundary word candidate being the start boundary word of the entity proposal region, and a second probability of each of the at least one end boundary word candidate being the end boundary word of the entity proposal region; and determining the start boundary word of the entity proposal region based on the first probability, and the end boundary word of the entity proposal region based on the second probability.

In an embodiment of the present disclosure, the acquiring the entity recognition result for the text sequence to be recognized based on the entity candidate region includes: filtering the at least one entity candidate region to obtain at least one filtered entity candidate region; and classifying category of each of the at least one filtered entity candidate region to obtain the entity recognition result for the text sequence to be recognized.

In an embodiment of the present disclosure, the filtering the at least one entity candidate region to obtain filtered entity candidate regions includes: acquiring a corresponding first classification feature vector based on the context representation vector for a word covered by the entity candidate region; acquiring a probability of the entity candidate region belonging to an entity based on the first classification feature vector; and acquiring the filtered entity candidate region based on the probability of the entity candidate region belonging to the entity.

In an embodiment of the present disclosure, the classifying the category of each of the at least one filtered entity candidate region to obtain the entity recognition result for the text sequence to be recognized includes: acquiring a corresponding second classification feature vector based on the context representation vectors for a start boundary word and an end boundary word corresponding to each of the at least one filtered entity candidate region; and classifying category of each of the at least one filtered entity candidate region based on the second classification feature vector to obtain the entity recognition result for the text sequence to be recognized.

In an embodiment of the present disclosure, the acquiring the entity recognition result for the text sequence to be recognized based on the entity candidate region includes: acquiring a corresponding third classification feature vector based on the context representation vectors for a start boundary word and an end boundary word corresponding to the at least one entity candidate region; and classifying category of the at least one entity candidate region based on the third classification feature vector to obtain the entity recognition result for the text sequence to be recognized.

In an embodiment of the present disclosure, the acquiring the at least one entity candidate region in the text sequence to be recognized based on the at least one entity boundary word includes: acquiring a preset number of entity boundary words adjacent to the at least one entity boundary word from the text sequence to be recognized; acquiring the similarity between the context representation vector of the entity boundary word and the context representation vectors of the corresponding adjacent preset number of entity boundary words, respectively; acquiring the corresponding entity candidate region based on the similarity.

In an embodiment of the present disclosure, the acquiring the corresponding entity candidate region based on the similarity includes: based on the similarity, determining respectively a start boundary word and an end boundary word of the corresponding entity candidate region from the entity boundary word of the text sequence to be recognized and the preset number of entity boundary words adjacent to the entity boundary word; and determining the corresponding entity candidate region based on the start boundary word and the end boundary word.

According to an aspect of an example embodiment of the disclosure, provided is an entity recognition apparatus including: at least one memory configured to store program code; and at least one processor configured to read the program code and operate as instructed by the program code, the program code comprising: entity boundary word determining code configured to cause the at least one processor to determine at least one entity boundary word corresponding to a text sequence; entity candidate region determining code configured to cause the at least one processor to determine at least one entity candidate region in the text sequence based on the at least one entity boundary word; and entity recognition code configured to cause the at least one processor to perform entity recognition on the text sequence and identifying at least one entity in the text sequence based on the at least one entity candidate region.

According to an aspect of an example embodiment of the disclosure, an electronic device is provided, which includes a memory and a processor; the memory stores a computer program; and the processor is configured to execute the computer program to implement the above entity recognition method.

According to an aspect of an example embodiment of the disclosure, a non-transitory computer-readable storage medium is provided, wherein a computer program is stored thereon for implementing when the computer program is executed by a processor, the above entity recognition method.

BRIEF DESCRIPTION OF DRAWINGS

In order to more clearly illustrate the technical solutions in the example embodiments of the present disclosure, the drawings used in the description of the example embodiments of the present disclosure will be briefly described below.

DETAILED DESCRIPTION

Figure 1A:
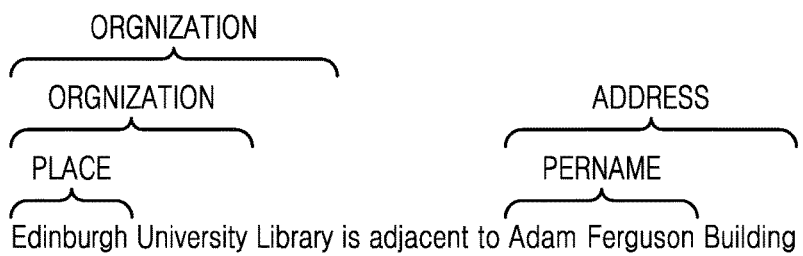
FIG. 1A is a schematic diagram of a nested entity recognition result according to an embodiment of the present disclosure.

Embodiments of the present disclosure will be described in detail hereafter. The examples of these embodiments have been illustrated in the drawings throughout which same or similar reference numerals refer to same or similar elements or elements having same or similar functions. The embodiments described below with reference to the accompanying drawings are exemplary and are only for the purpose of explaining the present disclosure and are not to be construed as limiting the present disclosure.

It is to be understood that the singular forms "a," "an," and "the" include plural referents unless the context clearly dictates otherwise. Thus, for example, reference to "a component surface" includes reference to one or more of such surfaces.

While describing the embodiments, technical content that is well known in the related fields and not directly related to the disclosure will not be provided. By omitting redundant descriptions, the essence of the disclosure will not be obscured and may be clearly explained.

For the same reasons, components may be exaggerated, omitted, or schematically illustrated in drawings for clarity. Also, the size of each component does not completely reflect the actual size. In the drawings, like reference numerals denote like elements.

As used herein, the term "and/or" includes any and all combinations of one or more of the associated listed items. Expressions such as "at least one of," when preceding a list of elements, modify the entire list of elements and do not modify the individual elements of the list. Throughout the disclosure, the expression "at least one of a, b or c" indicates only a, only b, only c, both a and b, both a and c, both b and c, all of a, b, and c, or variations thereof.

Advantages and features of one or more embodiments of the disclosure and methods of accomplishing the same may be understood more readily by reference to the following detailed description of the embodiments and the accompanying drawings. In this regard, the present embodiments may have different forms and should not be construed as being limited to the descriptions set forth herein. Rather, these embodiments are provided so that the disclosure will be thorough and complete and will fully convey the concept of the present embodiments to one of ordinary skill in the art, and the disclosure will only be defined by the appended claims.

Here, it will be understood that combinations of blocks in flowcharts or process flow diagrams may be performed by computer program instructions. Since these computer program instructions may be loaded into a processor of a general purpose computer, a special purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated consecutively may actually be executed substantially concurrently, or the blocks may sometimes be performed in a reverse order according to the corresponding function.

Here, the term "unit" in the embodiments of the disclosure means a software component or hardware component such as a field-programmable gate array (FPGA) or an application-specific integrated circuit (ASIC) and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with a smaller number of components and "units", or may be divided into additional components and "units". Furthermore, the components and "units" may be embodied to reproduce one or more central processing units (CPUs) in a device or security multimedia card. Also, in the embodiments, the "unit" may include at least one processor. In the disclosure, a controller may also be referred to as a processor.

The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: a, b, and c" includes any of the following combinations: a, b, c, a and b, a and c, b and c, and a and b and c.

Moreover, various functions described below may be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data may be permanently stored and media where data may be stored and later overwritten, such as a rewritable optical disc or an erasable memory device.

Artificial intelligence-related functions according to the disclosure are operated through a processor and a memory. A processor may include one or a plurality of processors. In this case, the one or the plurality of processors may each be a general purpose processor, such as a CPU, an AP, and a digital signal processor (DSP), a graphics dedicated processor, such as a GPU and a vision processing unit (VPU), or an artificial intelligence dedicated processor, such as an NPU. The one or the plurality of processors control to process input data according to a predefined operation rule or an artificial intelligence (AI) model stored in a memory. Alternatively, when the one or the plurality of processors are artificial intelligence dedicated processors, the artificial intelligence dedicated processors may be designed to have a hardware structure specialized for processing a specific AI model.

The predefined operation rule or the AI model may be constructed through learning. Here, construction through learning means that, as a basic AI model is trained by using a plurality of pieces of learning data according to a learning algorithm, a predefined operation rule or an AI model that is set to perform a desired characteristic (or purpose) is constructed. Such learning may be performed in a device in which an AI according to the disclosure is executed or may be performed through a separate server and/or a system. Examples of learning algorithms include supervised learning, unsupervised learning, semi-supervised learning, or reinforcement learning, but are not limited to the above examples.

An AI model may include a plurality of neural network layers. Each of the plurality of neural network layers has a plurality of weight values, and a neural network operation is performed through operations between an operation result of the previous layer and the plurality of weight values. The weight values of the neural network layers may be optimized through learning results of the AI model. For example, the plurality of weight values may be renewed such that a loss value or a cost value obtained by an AI model is during a learning process is reduced or minimized. Artificial neural Nested NER task refers to a phenomenon that the entity mentions in text are nested or overlapped. FIG. 1A is a schematic diagram of a nested entity recognition result according to an embodiment of the present disclosure. As shown in FIG. 1A, an ORGNIZATION entity "Edinburgh University" is nested in another ORGNIZATION entity "Edinburgh University Library". However, the nested structure makes the problem inefficient for conventional methods.

The nested NER method differs from non-nested NER in that: a conventional non-nested NER method can only recognize an outermost entity or innermost entity in the sentence, and there is no nesting/overlapping structure between all recognized entities, but the nested entity recognition may identify multi-granularity, nested, and overlapped entities, as shown in Table 1.

TABLE 1

| Conventional non-nested NER | Nested NER |
|---|---|

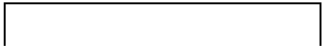
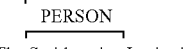
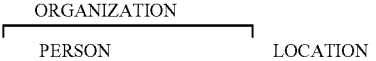

networks may include a deep neural network (DNN) and may include, for example, a convolutional neural network (CNN), a deep neural network (DNN), a recurrent neural network (RNN), a restricted Boltzmann machine (RBM), a deep belief network (DBN), a bidirectional recurrent deep neural network (BRDNN), and a deep Q-networks, but are not limited to the above examples.

Definitions for other certain words and phrases are provided throughout this patent document. Those of ordinary skill in the art should understand that in many if not most instances, such definitions apply to prior as well as future uses of such defined words and phrases.

Hereinafter, the disclosure will be described in detail with reference to the accompanying drawings.

In order to make the purpose, technical solution and advantages of the disclosure clearer, the following will further describe embodiments of the present disclosure in detail with reference to the accompanying drawings.

Named Entity Recognition (NER) is a subtask of information extraction that seeks to locate and classify named entities mentioned in unstructured text into pre-defined categories such as "person", "organization", "location", "time", etc. A named entity is a proper noun, serving as a name for something or someone, and may be defined according to actual needs.

Figure 1B:
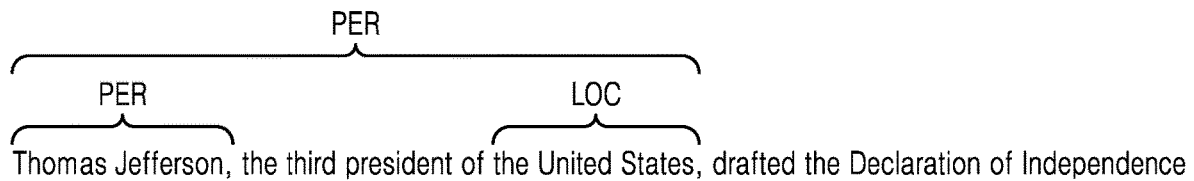
FIG. 1B is a schematic diagram of nested entities in a text sequence according to an embodiment of the present disclosure.

When performing entity recognition on a text sequence, for a text sequence that does not contain nested entities, it is necessary to identify independent entities (that is, entities that are not nested). For example, in a text sequence, "Hi, Bixby, how is the weather in Beijing today?", both 'Bixby' and 'Beijing' may be identified as entities, the former is "Product (PRO)" and the latter is "Location (LOC)". In this case, which specific type of entity in the text sequence is to be recognized depends on a set of entity categories defined by a recognition task. For a text sequence containing nested entities, it is necessary to identify both independent entities and nested entities (which may be understood as an entity containing two independent entities). FIG. 1B is a schematic diagram of nested entities in a text sequence according to an embodiment of the present disclosure. As shown in FIG. 1B, in the text sequence "Thomas Jefferson, the third president of the United States, drafted the 'Declaration of Independence'", "United States" (LOC) and "Thomas Jefferson" (Person, PER) are both independent entities, and "Thomas Jefferson, the third president of the United States" (PER) is a nested entity. In a process of entity recognition, all of "United States" (LOC), "Thomas Jefferson" (Person, PER), and "Thomas Jefferson, the third president of the United States" (PER) are required to be recognized. Conventional methods based on sequence annotation may only assign one label to each word and therefore cannot identify nested entities.

A region-based nested entity recognition method may be adopted, which is to identify multiple entity candidate regions in a text sequence to detect whether they are candidate entities, wherein a nested entity may be recognized since different nested entities correspond to different entity candidate regions respectively. The key to nested entity recognition is how to generate entity candidate regions corresponding to nested entities. In order to obtain entity candidate regions, the following schemes may be used: 1) nodes of a dependency parsing tree are used as entity candidate regions; 2) for an input text sequence containing N words, N(N+1)/2 candidate sub-sequences are generated, which the N(N+1)/2 candidate sub-sequences are used as entity candidate regions; and 3) a transition based method is used, which is to construct candidate sub-sequences through specially designed action sequences and to use the constructed candidate sub-sequences as entity candidate regions. However, the methods for acquiring entity candidate regions almost acquire all text sub-sequences corresponding to the text sequence, and the calculation cost for the entity candidate region acquisition processes and subsequent entity candidate region recognition process is relatively high.

In addition, Schema-based approaches may also be used for nested entity recognition, which are designed to express better annotation patterns to process nested entities instead of changing annotation units. A representative direction is based on a hypergraph method, where a hypergraph label is used to ensure that several word-level labels may recover nested entity candidates. Some scholars have also proposed a method based on bipartite graphs to process nested entity labels. However, these schemes require a refined design to prevent false structures and structural ambiguities, and stronger and unambiguous schemes may inevitably lead to higher training complexity and decoding time complexity.

Figures 2, 3:
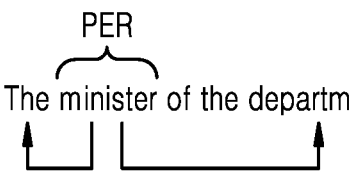
FIG. 2 is a schematic diagram of an example of acquiring entity candidate regions in the related art.
FIG. 3 is a schematic diagram of another example of acquiring entity candidate regions in the related art.

Based on the region-based nested entity recognition method, a method based on anchor-region networks is further proposed to obtain entity candidate regions corresponding to nested entities, which may be implemented by two schemes: 1) each word in the text sequence is used as an anchor word, and multiple entity candidate regions are obtained according to multiple preset widths. For example, a text sequence contains 6 words, which are t1, t2, t3, t4, t5, t6, with 6 preset widths, i.e., 1-6 respectively; the 6 preset widths correspond to 6 Proposals respectively, i.e., Proposal1-Proposal6. FIG. 2 is a schematic diagram of an example of acquiring entity candidate regions in this method. For the anchor word t3, the entity candidate regions corresponding to Proposal1-Proposal6 are shown in FIG. 2 respectively, where the regions within rectangular boxes are the entity candidate regions, for example, the entity candidate region corresponding to Proposal2 is [t3, t4]. 2) a certain head entity word in the text sequence is used as an anchor word, and the certain head entity word is further used as a boundary of a baseline-predicted entity candidate region, to obtain the entity candidate region. FIG. 3 is a schematic diagram of an example of acquiring entity candidate regions in this method. For example, as shown in FIG. 3, for the text sequence "The minister of the department", through the anchor word prediction network, the head entity word is obtained as "minister" (the entity category is "person (PER)"); and based on the head entity word "minister", it is predicted to obtain the corresponding candidate entity boundaries as "the" and "department", and then the corresponding entity candidate region is obtained. In the former implementation, since that a nested entity with large width exists in a text sequence, in order to make the obtained entity candidate regions cover all nested entities in the text sequence as much as possible, it is necessary to increase the number of preset widths, that is, more entity candidate regions need to be obtained, which may increase the complexity of model calculation. In the latter implementation, the head entity word of the text sequence cannot be determined in many senses, and thus the entity candidate region of the text sequence cannot be obtained. With respect to the foregoing problems, the embodiments of the present disclosure provide the following entity recognition methods.

Figure 4:
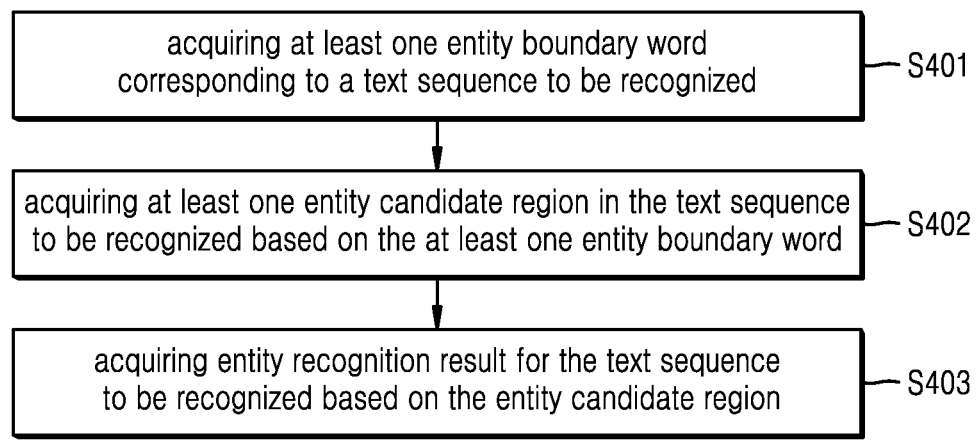
FIG. 4 is a schematic flowchart of a method for recognizing entity according to an embodiment of the present disclosure.

FIG. 4 is a schematic flowchart of an entity recognition method provided by an embodiment of the present disclosure. As shown in FIG. 4, the method may include: step S401, acquiring at least one entity boundary word corresponding to a text sequence to be recognized; step S402, acquiring at least one entity candidate region in the text sequence to be recognized based on the at least one entity boundary word; and step S403, acquiring entity recognition result for the text sequence to be recognized based on the at least one entity candidate region.

The scheme of the present disclosure may increase a rate (or a probability) of an entity candidate region covering entities in the text sequence to be recognized, without increasing the number of entity candidate regions, thereby decreasing complexity for calculation. Example embodiments of this scheme of the present disclosure are described below.

Embodiment 1

In an embodiment of the present disclosure, the acquiring the entity candidate region corresponding to the text sequence to be recognized may include: acquiring the entity proposal regions corresponding to the text sequence to be recognized; and acquiring corresponding entity candidate regions based on the entity proposal regions. The acquiring the entity proposal regions corresponding to the text sequence to be recognized may include: based on at least one preset width, taking respectively the words in the text sequence to be recognized as anchor words to acquire corresponding entity proposal regions having at least one preset width. Alternatively, an embodiment of the present disclosure, may determine the entity proposal regions through each word in the text to be recognized, and then determine a start boundary word and an end boundary word of the entity candidate regions from respective words in the text to be recognized, based on the entity proposal region.

An entity recognition method provided by an embodiment of the present disclosure may include: acquiring at least one entity proposal region corresponding to the text sequence to be recognized; acquiring the entity candidate region corresponding to the entity proposal region; and acquiring entity recognition result for the text sequence to be recognized based on the entity candidate region.

Figures 5, 6:
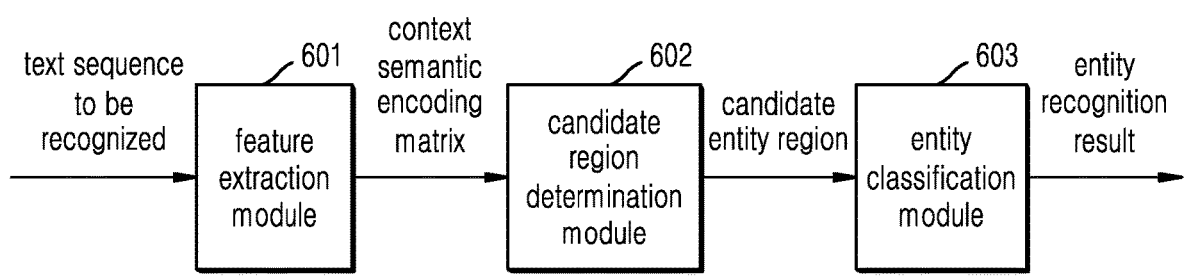
FIG. 5 is a schematic diagram of acquiring entity proposal region according to an embodiment of the present disclosure.
FIG. 6 is a schematic diagram of a method for recognizing entity through an entity recognition network according to an embodiment of the present disclosure.

/The anchor word of the entity proposal region may be any word in the text sequence to be recognized, and the width of the entity proposal region may be any width not greater than the width of the text sequence to be recognized. FIG. 5 is a schematic diagram of acquiring entity proposal region according to an embodiment of the present disclosure. Referring to FIG. 5, for example, a certain text sequence to be recognized contains 5 words, i.e., t1, t2, t3, t4, and t5 successively, and three kinds of width corresponding to entity proposal regions are predefined as 1, 3, and 5, wherein the three kinds of width correspond to three kinds of Proposal, respectively, Proposal1-Proposal3. Then, when t3 is selected as the anchor word, the corresponding entity proposal region may be as shown in FIG. 5, where the region in the rectangular box is the entity proposal region, for example, the entity proposal region corresponding to Proposal2 is [t2, t4]. It should be noted that the entity proposal region corresponding to Proposal2 may also be [t3, t5] or [t1, t3], as long as the anchor word of the corresponding entity proposal region is t3 and the width is 3. For the text sequence to be recognized, where the anchor words of the entity proposal region and the entity proposal region with the corresponding relationship are the same, but the boundary words are different, the corresponding entity candidate region then may be obtained by adjusting the boundaries of respective entity proposal regions.

In an embodiment, in the process of obtaining the corresponding entity candidate region by adjusting the boundaries of respective entity proposal regions, by referring to the association relationship between the entity proposal region and each word in the text sequence to be recognized, the adjusted boundary is more accurate, that is, compared with multiple entity proposal regions, corresponding multiple entity candidate regions have higher coverage of entities in the text sequence to be recognized. Since each entity candidate region may cover both independent entities and nested entities, when classifying respective entity candidate regions, the independent entities and nested entities in the text sequence to be recognized may be identified to obtain the corresponding entity recognition result.

In the solution provided by the embodiment of the present disclosure, through performing boundary adjustment on respective entity boundary words in a text sequence to be recognized to obtain corresponding entity candidate regions, by referring correlation of an entity boundary word and respective words in the text sequence to be recognized, and performing recognition on the respective entity candidate regions to obtain corresponding entity recognition result, the scheme may increase a rate of an entity candidate region covering entities in the text sequence to be recognized, without increasing the number of entity candidate regions, thereby decreasing complexity for calculation.

FIG. 6 is a schematic diagram of a method for recognizing entity through an entity recognition network according to an embodiment of the present disclosure. In the embodiment of the present disclosure, the above entity recognition process may be implemented through a preset entity recognition network. The entity recognition network may have a structure as shown in FIG. 6, which may include a sequentially connected feature extraction module (also referred to as a semantic encoding module or sentence coding module) 601, a candidate region determination module (also referred to as a candidate generating module) 602, and an entity classifier module (also referred to as an entity category classification layer module) 603. The feature extraction module 601 may be used to extract the features of the input text sequence to be recognized to obtain the corresponding context semantic encoding matrix; the candidate region determination module 602 may be used to receive the context semantic encoding matrix output by the feature extraction module 601 and output multiple entity candidate regions of the text sequence to be recognized; and the entity classifier module 603 may be used to receive the multiple entity candidate regions output by the candidate region determination module and output corresponding entity recognition results. The processing procedures in each module in the entity recognition process of the text recognition network may be further described in the following description.

In an embodiment of the present disclosure, the acquiring an entity candidate region corresponding to the entity proposal region includes: acquiring the entity candidate region corresponding to the entity proposal region, through an entity recognition network, based on a context semantic encoding matrix corresponding to the text sequence to be recognized.

It should be noted that the context semantic encoding matrix in this scheme is a context representation matrix, and the context semantic encoding vector is a context representation vector.

The context semantic encoding vector of each word in the text sequence to be recognized may be obtained through the context semantic encoding matrix, which includes the context semantic encoding vector of each word covered by the entity candidate region baseline; the relationship between the context semantic encoding vector of each word covered by the entity candidate region baseline and the context semantic encoding vector of each word in the text sequence to be recognized is set as the basis of boundary adjustment, to obtain the entity candidate region. This process may be performed in the candidate region determination module of the entity recognition network.

In an embodiment of the present disclosure, the acquiring the entity candidate region corresponding to the entity proposal region/entity proposal window, through an entity recognition network, based on a context semantic encoding matrix corresponding to the text sequence to be recognized includes: acquiring similarity between a context semantic encoding vector and a corresponding combination vector for a word in the text sequence to be recognized, based on the context semantic encoding matrix corresponding to the text sequence to be recognized and the combination vector corresponding to the entity proposal region; and determining an entity candidate region corresponding to the entity proposal region, based on the similarity.

The relationship between the context semantic encoding vector of each word covered by the entity candidate region baseline and the context semantic encoding vector of each word in the text sequence to be recognized, may correspond to similarity between a combination vector corresponding to the entity candidate region baseline and the context semantic encoding vector of each word in the text sequence to be recognized.

In an embodiment, for each entity proposal region, the similarity between the context semantic encoding vector of each word in the text sequence to be recognized and the combination vector corresponding to the entity proposal region may be acquired, that is, each word corresponds to one similarity. According to the size relationship of the similarity corresponding to each word, the boundaries of the corresponding entity proposal region may be adjusted, that is, the boundary words are re-determined for the entity proposal region, to obtain then the corresponding entity candidate region, and the possibility of the entity candidate region covering entities is greater that for the entity proposal region. Next, the entity classifier module classifies the entities in the entity candidate region to obtain the corresponding entity recognition result.

In an embodiment of the present disclosure, the acquiring similarity between a context semantic encoding vector and a corresponding combination vector for a word in the text sequence to be recognized, based on the context semantic encoding matrix corresponding to the text sequence to be recognized and the combination vector corresponding to the entity proposal region includes: acquiring the context semantic encoding vector for a word in the text sequence to be recognized, based on the context semantic encoding matrix corresponding to the text sequence to be recognized; acquiring the corresponding combination vector, based on a feature vector corresponding to a word covered by the entity proposal region and a context semantic encoding vector for a corresponding anchor word; and acquiring similarity between a context semantic encoding vector for a word in the text sequence to be recognized and a corresponding combination vector for the corresponding entity proposal region, based on calculating of multi-head self-attention operation on the combination vector corresponding to the entity proposal region and the context semantic encoding vector for the word in the text sequence to be recognized.

The combination vector corresponding to a respective entity proposal region may be a sum of the feature vector corresponding to each entity proposal region and the context semantic encoding vector for a corresponding anchor word, that is, the combination vector incorporates the corresponding information related to entity proposal region and anchor word.

In an embodiment, the multi-head self-attention operation is used to calculate the similarity between the combination vector and each word, where the similarity corresponding to each baseline matrix is acquired through the multi-head self-attention algorithm by setting the combination vector corresponding to each baseline matrix as a corresponding query matrix in the multi-head self-attention algorithm and setting the context semantic encoding matrix of the text sequence to be recognized as a corresponding key matrix in the multi-head self-attention algorithm, and then the similarity here may also be referred to as attention score. In an embodiment, for the text sequence to be recognized, the context semantic encoding vector of each word is $u_i$ (i=1, 2, 3 ... L), and k preset width for acquiring entity proposal regions is preset (k may be a small integer, e.g., 1, 2, 3, etc.), and one entity proposal region (hereinafter referred to as entity proposal region corresponding to ki) for the text region to be recognized is acquired according to the k-th preset width with the i-th word as the anchor word, where the similarity between the combination vector corresponding to the entity proposal region and the context semantic encoding vector of each word is acquired by the following formula:

$$\begin{cases} A_{lk} = \text{Softmax}(\langle Q_{lk}, K_{lk} \rangle), \\ A_{rk} = \text{Softmax}(\langle Q_{rk}, K_{rk} \rangle) \end{cases}$$

where $\langle \cdot, \cdot \rangle$ represents an inner product operation, and $$Q_h \in R^{L \times \frac{D}{2K}}, K_h \in R^{L \times \frac{D}{2K}}$$

are respectively the query matrix and the key matrix in the self-attention calculation, where $h \in \{lk, rk\}$ are all derived from the linear transform of the context semantic encoding matrix of the text sequence to be recognized $U \in R^{L \times D'}$ (firstly, U is linearly transformed as $Q = F(U) \in R^{L \times D}$, and then Q is divided into 2K heads according feature dimension, that is, 2K parts $\{Q_1, Q_2, \ldots, Q_{2K}\}$, wherein $$Q_h \in R^{L \times \frac{D}{2K}}$$

and each head corresponds to one query matrix, and is acquired by similar operations). In order to regress the boundaries of the entity candidate region based on the entity proposal region corresponding to the k-th preset width, the feature vector $P_k$ corresponding to each entity proposal region may be added into the query matrix of the self-attention calculation, that is $Q_{lk} \leftarrow Q_{lk} + P_k$, $Q_{rk} \leftarrow Q_{rk} + P_k|$.

In an embodiment of the present disclosure, the feature vector corresponding to any entity proposal region is obtained in the following ways: obtaining a corresponding feature vector, by setting a width of an entity proposal region as a convolution kernel width and performing convolution processing on a concatenated vector corresponding to the context semantic encoding vector for the word covered by the entity proposal region.

In an embodiment, for the entity proposal region corresponding to ki, its feature vector is obtained by the following formula:

$$p_{ki} = \text{Conv1D}_k(u_i) = \text{ReLU}(W_k U_{i-k+1:i+k-1})$$

where ReLU is a preset activation function, $u_{i-k+1:i+k-1}$ is the concatenated vector corresponding to the context semantic encoding vector of the words covered by the entity proposal region corresponding to ki, and $W_k$ and $2k-1$ represent the size of the convolution kernel and the convolution window, respectively. Words in all positions $u_i$ may be processed simultaneously, and the convolution operation may be recorded as $P_k = \text{Conv1D}_k(U)$.

In an embodiment of the present disclosure, by the boundary determination sub-module, the determining entity candidate region corresponding to the entity proposal region, based on the similarity includes: determining, a word with the highest degree of similarity among the words between the anchor word corresponding to the entity proposal region and a first end word of the text sequence to be recognized, as a start boundary word of the corresponding entity candidate region, and a word with the highest degree of similarity among the words between the anchor word and a second end word of the text sequence to be recognized, as an end boundary word of the corresponding entity candidate region; and determining the entity candidate region based on the first boundary word and the second boundary word.

If a respective word in the text sequence to be recognized is regarded as a horizontally arranged sequence, then the first end word may be considered as the left end word in the text sequence to be recognized, which is located on the left side of the anchor word, and then the corresponding first boundary word is the start boundary word. Similarly, it may be considered that the second end word is the right end word in the text sequence to be recognized, which is located on the right side of the anchor word, and then the corresponding second boundary word is the end boundary word. In order to facilitate understanding and description, the solution may be described below with the first boundary word as the start boundary word and the second boundary word as the end boundary word.

In an embodiment, in the process of obtaining the corresponding entity candidate region by adjusting the boundaries of the entity proposal region, it needs to determine the adjusted left and right boundaries respectively, that is, to determine the start and end boundary words of the entity candidate region respectively. Higher similarity between the context semantic encoding vector and the combination vector of each word in the text to be recognized, means higher matching degree between the word and boundaries of the target entity candidate region corresponding to the anchor word; In an embodiment, a word with the highest similarity to the combination vector among words on the left of the anchor word is found as the start boundary word of the entity candidate region, and a word with the highest similarity to the combination vector among words on the right of the anchor word is found as the end boundary word of the entity candidate region, to obtain the entity candidate region.

In an embodiment, from the magnitude of the similarity of respective words on the left side of the above anchor word and the magnitude of the similarity of respective words on the right side of the anchor word, locations of the start boundary word and the end boundary word may be obtained through the following calculation formula:

$$\begin{cases} l_{ki} = \underset{j \leq i}{\mathrm{argmax}} A_{lk}[i, j] \\ r_{ki} = \underset{j \leq i}{\mathrm{argmax}} A_{rk}[i, j] \end{cases}$$

where $A_{lk}[i,j]$ represents the location element in line i, row j in the scoring matrix $A_{lk}$, $l_{ki}$ is the left boundary of the entity candidate region corresponding to the entity proposal region corresponding to ki, and $r_{ki}$ is the right boundary of the entity candidate region corresponding to the entity proposal region corresponding to ki; it may be understood that the left boundary corresponds to the anchor word and one of the words on the left side of the anchor word in the text sequence to be recognized, and the right boundary corresponds to the anchor word and one of the words on the right side of the anchor word in the text sequence to be recognized, wherein the entity candidate region corresponding to the entity proposal region corresponding to ki is $[t_{l_{ki}}, \cdots, t_i, \cdots, t_{r_{ki}}]$.

In an embodiment of the present disclosure, the acquiring at least one entity proposal region corresponding to a text sequence to be recognized includes: acquiring a corresponding entity proposal region with the at least one preset width, by setting a word in the text sequence to be recognized as an anchor word respectively, based on the at least one present width, thought the entity recognition network.

In an embodiment, if there are L (L≥1) words (including punctuation marks) in the text sequence to be recognized, and there are K (K≥1) preset widths, then the number of the entity proposal regions corresponding to each word in the text sequence to be recognized is K, and the total number of entity proposal regions corresponding to all words in the text to be recognized is L*K. It can be seen that the entity proposal region in the embodiment of the present disclosure is substantially consistent with the entity candidate region obtained in implementation 1) of the scheme for obtaining an entity candidate region based on an anchor-region network. It can be seen from the foregoing description that in the solution of the present disclosure, it may need to adjust the boundaries of the entity proposal region to obtain an entity candidate region with a higher coverage rate. The step of obtaining the entity proposal regions may also be performed in the entity candidate region determination module.

In an embodiment of the present disclosure, the acquiring entity recognition result for the text sequence to be recognized based on the entity candidate region includes: acquiring a filtered entity candidate region through the entity recognition network based on the context semantic encoding vector corresponding to each word covered by each entity candidate region; and acquiring a type and a position of an entity in the filtered entity candidate region through the entity recognition network.

In an embodiment, some of respective entity candidate regions output by the entity candidate region determination module may not contain an entity, and therefore, respective entity candidate regions may be filtered by the entity candidate filter layer, and the filtered entity candidate region may be input to the entity classifier module for entity recognition, to obtain the corresponding entity type and position.

The entity candidate filter layer may be located between the entity candidate region determination module and the entity classifier module. It should be noted that the entity candidate filter layer is not a necessary structure for the entity recognition network. When the entity recognition network does not have the entity candidate filter layer, the entity recognition module directly classifies the entity candidate regions output by the entity candidate region determination module.

In an embodiment of the present disclosure, the acquiring filtered entity candidate region through the entity recognition network based on the context semantic encoding vector corresponding to each word covered by the entity candidate region includes: acquiring a corresponding first classification feature vector, based on the context semantic encoding vector for each word covered by the entity candidate region; acquiring a probability that each entity candidate region contains an entity, based on the first classification feature vector corresponding each entity candidate region; and acquiring the filtered entity candidate region based on the probability that each entity candidate region contains an entity.

The feature vector corresponding to each entity candidate region may be obtained by averaging the context semantic encoding matrix corresponding to each word covered by the entity candidate region. For example, if a certain entity candidate region corresponds to 5 words, a context semantic encoding matrix (D*5 dimensional matrix, D≥1, and an integer) corresponding to these 5 words is obtained from the context semantic encoding matrix in the text sequence to be recognized, and the D*5 dimensional matrix is averaged by row to obtain the first classification feature vector (D*1 column vector) for the entity candidate region.

In addition, the feature vector corresponding to each entity candidate region may also be the concatenated vector corresponding to the context semantic encoding vectors of the start boundary word, end boundary word, and anchor word, that is, $h_{ki} = u_{lik} \oplus u_{rik} \oplus u_i$.

In an embodiment, after the first classification feature vector of each entity candidate region is obtained, the following classifiers are used to filter each entity candidate region:

$$p_{ki} = \mathrm{Softmax}(W h_{ki})$$

where $p_{ki}$ is the probability that the entity candidate region corresponding to the entity proposal region corresponding to ki contains an entity, $W \in R^{2 \times 3D}$ is a linear transformation parameter matrix (the dimension of the parameter matrix depends on $h_{ki}$ feature vector dimension), and $h_{ki}$ is the first classification feature vector corresponding to the entity candidate region corresponding to the entity proposal region corresponding to ki.

After the probability of each entity candidate region containing the entity is obtained, an entity candidate region of which probability is greater than or equal to the first preset value is used as the filtered entity candidate region.

In an embodiment of the present disclosure, the acquiring type and position of an entity in the filtered entity candidate region through the entity recognition network includes:

acquiring a corresponding second classification feature vector, based on the context semantic encoding vector for the boundary word corresponding to the filtered entity candidate region; and acquiring corresponding type and position, based on the second classification feature vector corresponding to the filtered entity candidate region.

The second classification feature vector of each entity candidate region may be obtained by concatenating the context semantic encoding vectors corresponding to the corresponding start and end boundary words. For example, if the context semantic encoding vector of the start boundary word of a certain entity candidate region is $u_{l_{ki}}$, and the context semantic encoding vector of the end boundary word is $u_{r_{ki}}$, then the coding vector corresponding to the entity candidate region is $u_{l_{ki}} \oplus u_{r_{ki}}$.

In addition, the second classification feature vector of each entity candidate region may also be obtained by concatenating context semantic encoding vectors corresponding to the start boundary word, end boundary word, and anchor word.

In an embodiment, after the second classification feature vector of each entity candidate region is obtained, the following classifiers are used to classify each obtained entity candidate region:

$$o_{ki} = \text{softmax}(W_2 \cdot \text{ReLU}(W_1 \cdot e_{ki}))$$

where $o_{ki}$ is the predicted probability vector of the entity type of the entity candidate region corresponding to the entity proposal region corresponding to ki, $W_1 \in R^{2D \times H}$ and $W_2 \in R^{C \times H}$ are all linear transformation parameter matrices, and $e_{ki}$ is the second classification feature vector corresponding to the entity candidate region corresponding to the entity proposal region corresponding to ki, where C is equal to the number of entity categories, and C includes categories that do not belong to an entity, and is used to further filter entity candidate regions.

It should be noted that the method of the embodiment of the present disclosure may recognize both nested entities and independent entities. In the case that the recognized text sequence to be recognized does not contain nested entities, it only needs to perform conflict judgment on the recognized entities after the recognition is completed. Here, the non-maximum suppression (NMS) algorithm may be used to process redundant and overlapping entity candidate regions, and to output real entities. The idea of NMS is simple and effective: when the entity classifier module classifies the entity candidate regions, the predicted probability of the entity corresponding to each entity candidate region is set as selecting a candidate entity with the highest probability, a conflicting candidate entity is deleted, and the previous process is repeated until all candidate entities have been processed. Finally, these non-conflicting candidate entities may be obtained as the final recognition result.

In an embodiment of the present disclosure, the method may further include: before acquiring an entity candidate region corresponding to the entity proposal region, acquiring a context semantic encoding matrix corresponding to the text sequence to be recognized, through the entity recognition network.

In an embodiment, the step of acquiring the context semantic encoding matrix for the text sequence to be recognized is performed in the feature extraction network.

In an embodiment of the present disclosure, the acquiring a context semantic encoding matrix corresponding to the text sequence to be recognized, through the entity recognition network includes: acquiring an initial context semantic encoding matrix corresponding to the text sequence to be recognized; and acquiring the corresponding context semantic encoding matrix, based on the initial sentence context semantic encoding matrix and a part-of-speech embedded matrix corresponding to the text sequence to be recognized.

The sentence encoder layer (e.g., the feature extraction module) may further include an ELMo (Embeddings from Language Models) sub-module and a Bi-directional Long Short-Term Memory (Bi-LSTM) sub-module.

In an embodiment, for a text sequence x=(t1, t2, ..., tL) containing L words to be recognized, the input text is coded by ELMo to obtain the corresponding initial context semantic encoding matrix $W_{ELMo} = \text{ELMo}(x) \in R^{L \times E}$, wherein E is the dimension of the word vector. Considering the part-of-speech has an important influence on entity boundaries and entity category recognition, it is assuming that the part-of-speech sequence corresponding to the text sequence to be recognized is (p1, p2, ..., pL), and its corresponding part-of-speech embedding matrix is $W_{pos} \in R^{L \times p}$, where p is the dimension of each part-of-speech embedding vector. Then, $W_{ELMo}$ and $W_{pos}$ are concatenated by word and input into the Bi-directional Long Short-Term Memory sub-module, to obtain the context semantic encoding matrix $U = \overline{H} \oplus \overline{H} \in R^{D \times L}$, of the text sequence to be recognized, wherein $\overline{H}$, $\overline{H}$ are the forward hidden vector representation and the backward hidden vector representation of Bi-LSTM, respectively.

A sentence coder may be defined by other methods. For example, the feature extraction module may only include the BERT (Bidirectional Encoder Representations from Transformers) module, through which the context semantic encoding matrix U=BERT(x) corresponding to the text sequence to be recognized is acquired.

In an embodiment of the present disclosure, the entity recognition network is obtained through training in the following ways: determining a training loss function, the training loss function including a boundary loss function, an entity candidate region filtering loss function, and an entity classifying loss function; acquiring a training sample set, text sequence samples in the training sample set being annotated with a position label and type label of a real entity; and training the entity recognition network until a value of the training loss function meeting a preset conditions, based on the training loss function and the training sample set, to obtain a trained entity recognition network.

In the training stage for the entity recognition network, three loss functions are used for joint training, namely the boundary loss function, the entity candidate region filtering loss function, and the entity classification loss function.

In an embodiment, the boundary loss function is mainly used to optimize the entity candidate region determination module. When the left and right boundaries of the entity candidate region are optimized using similarity, the corresponding cross entropy loss function is as follows:

$$L_{left} = \Sigma_{k=1}^{K} \Sigma_{i=1}^{L} CE(A_{lk}[i,:], l_{ki})$$

$$L_{right} = \Sigma_{k=1}^{K} \Sigma_{i=1}^{L} CE(A_{rk}[i,:], r_{ki})$$

where CE(•, •) represents a standard cross-entropy loss function, $l_{ki}$ and $r_{ki}$ are respectively the left and right boundary positions of the target entity candidate region corresponding to the entity proposal region corresponding to ki, $A_{lk}[i,:]$ is the representation vector of the similarity of each word in the entity proposal region being the left boundary corresponding to ki, and $A_{rk}[i,:]$ is the representation vector of the similarity of each word in the entity proposal region being the right boundary corresponding to ki. The boundary loss function is $L_b=L_{left}+L_{right}$.

The entity candidate region filtering loss function is mainly used to optimize the entity candidate filter layer. The entity candidate filter layer is used to determine the probability that the entity candidate region belongs to an entity, which belongs to the binary classification judgment. The corresponding binary cross-entropy loss function is as follows:

$$L_r=\Sigma_{k=1}^{K}\Sigma_{i=1}^{L}CE(p_{ki},y_{ki})$$

where $y_{ki}$ is the judgment result of whether the entity candidate region corresponding to the entity proposal region corresponding to ki contains an entity, and $p_{ki}$ is the probability that the entity candidate region corresponding to the entity proposal region corresponding to ki contains an entity.

The entity classification loss function is mainly used to optimize the entity classifier module, and the corresponding cross-entropy loss function is as follows:

$$L_c=\Sigma_{k=1}^{K}\Sigma_{i=1}^{L}CE(o_{ki},y_{ki})$$

where $y_{ki} \in \{0, 1, \ldots, C\}$ is an entity type label corresponding the entity candidate region m=$[l_{ki}, r_{ki}]$ for the corresponding entity proposal region corresponding to ki, and $o_{ki}$ is a predicted probability vector of the entity type of the entity candidate region corresponding to the entity proposal region corresponding to ki.

In the model training stage, the embodiment of the present disclosure adopts an end-to-end optimization method to optimize boundary loss, entity candidate region filtering loss, and entity classification loss, simultaneously. The optimized target loss function of the entire model is defined as:

$$L=L_b+L_r+L_c$$

In addition, in the optimization process of the entity candidate filter layer, it is considered that the entity candidate region obtained by the entity candidate region determination module may have errors, and the obtained entity candidate regions may lack diversity, making it difficult for the entity candidate filter layer for quickly optimization. In order to avoid the accumulation of errors in the training process, when optimizing the entity candidate filter layer, the embodiment of the present disclosure may combine pairs of words in the input sample text sequence to form entity candidate regions. If all the combined entity candidate regions are input to the entity candidate filter layer, it may bring higher computational complexity, and the negative sample size may be much larger than the number of positive samples, which is not conducive to model optimization. In order to avoid this problem, negative samples are negatively sampled.

In an embodiment of the present disclosure, the loss value of the boundary loss function corresponding to any entity candidate region is obtained in the following ways: acquiring a target entity candidate region of the entity candidate region, based on degree of coincidence between a word covered by the entity proposal region corresponding to the entity candidate region and a word covered by the real entity in the text sequence sample; and substituting a similarity representation vector of a boundary corresponding to the entity candidate region and a one-hot representation vector of a boundary of the target candidate entity into the boundary loss function, to obtain the corresponding loss value.

In the training process, to obtain the value of the boundary loss function, the target entity candidate region corresponding to respective entity proposal regions is obtained, and the target entity candidate region is used as a supervision label for optimizing the entity candidate region determination module.

In an embodiment, for each entity proposal region, based on the degree of coincidence between the words covered by the entity proposal region and the word set covered by each real entity in the text sequence sample, which is also referred to as Intersection-over Union Ratio (IoU Ratio), the corresponding target entity candidate region is determined. The calculation formula for each degree of coincidence is as follows:

$$\frac{|P_{ki} \cap E_m|}{|P_{ki} \cup E_m|}$$

where $P_{ki}$ is the set of words covered by the entity proposal region corresponding to ki, and $E_m$ is the set of words covered by the m-th (m=1, 2, 3 . . . ) real entity in the text sample sequence. After the target entity candidate region corresponding to respective entity proposal regions is determined according to the degree of coincidence, a similarity representation vector of a boundary corresponding to the entity candidate region and a one-hot representation vector of a boundary of the target candidate entity, are substituted into the boundary loss function, to obtain the left and right boundary loss, and then obtain the corresponding loss value.

Further, the acquiring a target entity candidate region of the entity candidate region, based on degree of coincidence between a word covered by the entity proposal region corresponding to the entity candidate region and a word covered by the real entity in the text sequence sample, includes: setting, if the degree of coincidence corresponding to the entity candidate region is not less than a preset threshold, a region corresponding to a respective real entity as the corresponding target entity candidate region; and setting, if the degree of coincidence corresponding to entity candidate region is less than the preset threshold, a region corresponding to the anchor word of the entity candidate region as the corresponding target entity candidate region.

In an embodiment, for each entity proposal region, if the degree of coincidence with the set of words covered by a certain real entity is not less than a preset threshold (e.g., the preset threshold may be set as 0.1), then the region corresponding to the real entity is determined as the target entity candidate region corresponding to the entity proposal region. If the degree of coincidence with the set of words covered by a certain real entity is less than the preset threshold, the corresponding anchor word is used as the corresponding target entity candidate region.

In addition, in the process of training the entity recognition network, by setting multiple widths (also referred to as scales) in advance, multi-scale basic entity regions may be obtained. The setting of multi-scale basic regions may be used to determine which real entity is regressed during training, and also to regress all real entities in the text sample sequence according to the coincidence score.

Figure 7:
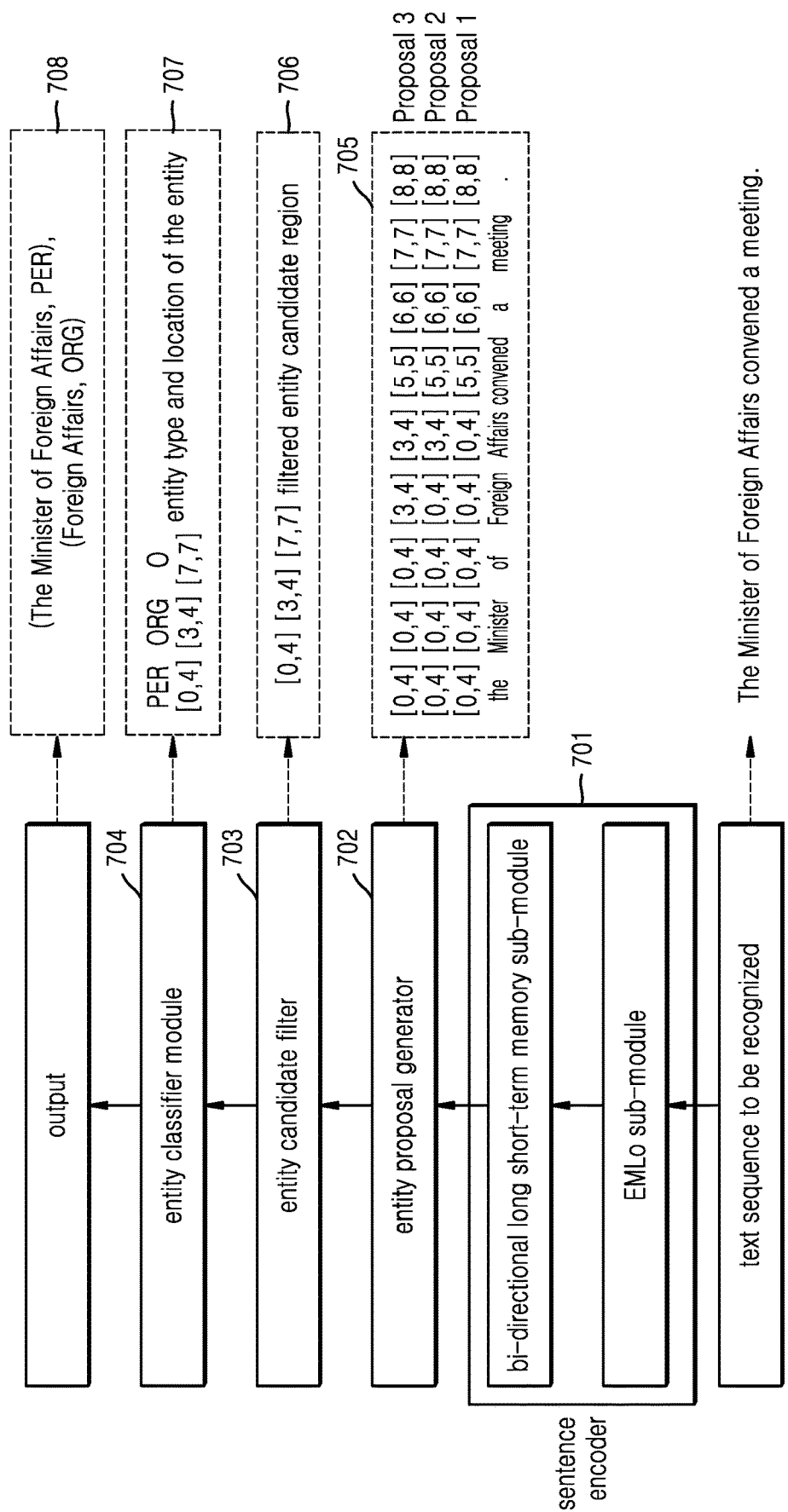
FIG. 7 is a schematic diagram of performing entity recognition on a text sequence to be recognized through an entity recognition network according to an embodiment of the present disclosure.

The following further illustrates an example of a solution of an embodiment of the present disclosure. FIG. 7 is a schematic diagram of performing entity recognition on a text sequence to be recognized through an entity recognition network according to an embodiment of the present disclosure. A pre-trained entity recognition network is used to recognize a text sequence (e.g., "The Minister of Foreign Affairs convened a meeting." In FIG. 7) to be recognized containing nested entities. As shown in FIG. 7, the entity recognition network in this example embodiment includes a sentence encoder layer 701, an entity proposal generator layer 702, an entity candidate filter layer 703, and an entity classifier module 704. The sentence encoder layer 701 further includes sequentially connected ELMo sub-module and bi-directional long short-term memory sub-module. The text sequence to be recognized is input into the entity recognition network, and finally the entity recognition result is output.

In an embodiment, in the entity proposal generator layer 702, three preset widths are preset for obtaining the corresponding entity proposal regions, and the three preset widths correspond to three different proposals, respectively, e.g., Proposal1 corresponds to the preset width 1, Proposal2 corresponds to the preset width 3, and Proposal3 corresponds to the preset width 5. The entity proposal generator layer 702 outputs 27 entity candidate regions corresponding to different proposals. As shown in the dashed box 705, the entity candidate filter layer 703 filters 27 entity candidate regions to obtain three filtered entity candidate regions. As shown in the dashed box 706, the entity classifier module 704 classifies the three filtered entity candidate regions to obtain the entity type, wherein the entity candidate region [7,7] does not belong to any entity type. As shown in the dashed box 707, the entity recognition network finally outputs the nested entity "The Minister of Foreign Affairs" contained in the text sequence to be recognized and the corresponding entity type PER, wherein the independent entity is "Foreign Affairs" and the corresponding type is ORG, as shown in the dashed box 708.

Embodiment 2

In an embodiment of the present disclosure, the acquiring at least one entity candidate region in the text sequence to be recognized based on the at least one entity boundary word may include: acquiring an entity proposal region corresponding to the text sequence to be recognized based on the entity boundary word; and acquiring corresponding entity candidate region based on the entity proposal region. In an embodiment, according to an embodiment of the present disclosure, it may determine the entity proposal region through the entity boundary word, and then determine the start boundary word and the end boundary word of the entity candidate region from entity boundary words, based on the entity proposal region.

Figure 8:
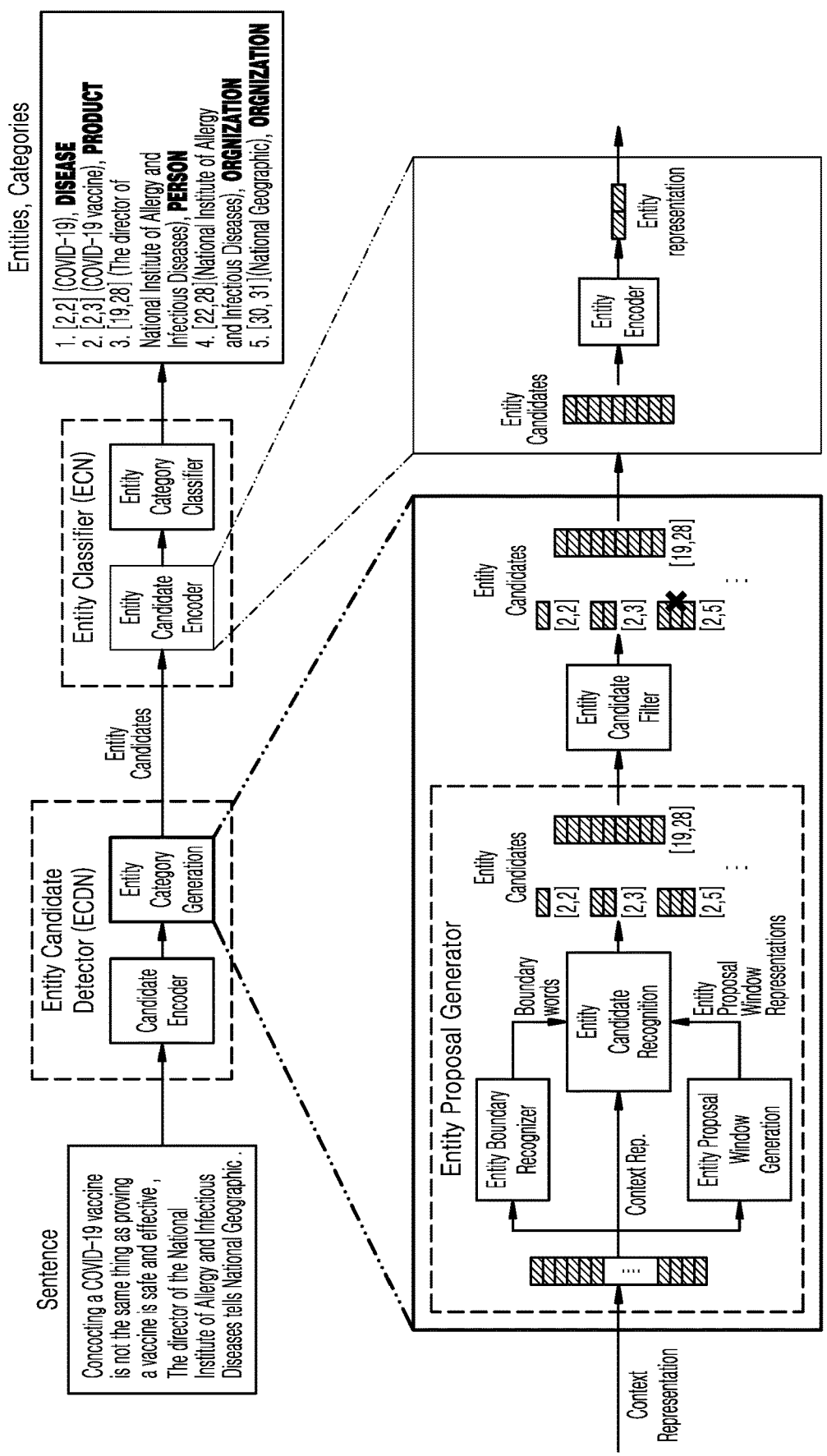
FIG. 8 is a schematic structural diagram of entity recognition network model according to an embodiment of the present disclosure.

FIG. 8 is a schematic structural diagram of entity recognition network model according to an embodiment of the present disclosure. FIG. 8 illustrates an architecture diagram of a model for implementing an entity recognition method according to an embodiment of the present disclosure. The model may be referred to as a Temporal Region Proposal Network (TRPN), and as shown in FIG. 8, the model may include two modules: an entity candidate detector module and an entity classifier module. The composition and function of these two modules are described separately below.

1. Entity Candidate Detector Network module (ECDN). This module is used to detect all possible entity candidates (i.e., entity candidate regions) in the input text (i.e., the text sequence to be recognized). The ECDN takes a sentence as input and outputs all entity candidates. This module includes two sub-modules: a sentence encoder layer and an entity candidate generating layer.

The sentence encoder layer uses Bidirectional Long Short Term Memory (Bi-LSTM)/Convolutional Neural Networks (CNN)/Bidirectional Encoder Representations from Transformers (BERT) to perform semantic encoding on the input sentence to obtain a context representation vector of each word. The entity candidate generating layer may dynamically detect possible entity candidates with different granularities in the input text. This module includes two parts: an entity proposal window generation layer and an entity candidate filter layer.

The entity proposal window generation layer uses the generated Entity Proposal Windows (that is, different region widths) as the entity region baseline to dynamically predict the entity proposal regions in various granularities. Here, a fast and memory-efficient boundary attention is designed to speed up the model inference, that is, it may first identify possible entity boundary words in the sentence through the entity boundary recognizer layer, and then calculate boundary attention scores only on the entity boundary words.

The entity candidate filter layer uses a binary classification layer to determine a probability that a generated entity candidate belongs to a real entity, and filter the generated entity candidates according to the probability.

2. Entity Classifier Network module (ECN). This module is used to classify the entity category of the entity candidates obtained by the detector module according to a predefined entity category set. The ECN takes each generated entity candidate and representation as input and outputs its entity category. This module includes two sub-modules: an entity candidate encoder layer and an entity category classification layer.

The entity candidate encoder layer is used to transform entity candidate representations into fixed-dimensional feature vectors. The entity candidate encoder layer takes each generated entity candidate and its context representation as input, and outputs its corresponding entity category.

The entity category classification layer classifies entity category for each entity candidate. The entity category classification layer takes an entity feature vector of the entity candidate as input, predicts a probability that the entity belongs to a respective entity category, and determines the entity category with the highest probability.

Figure 9A:
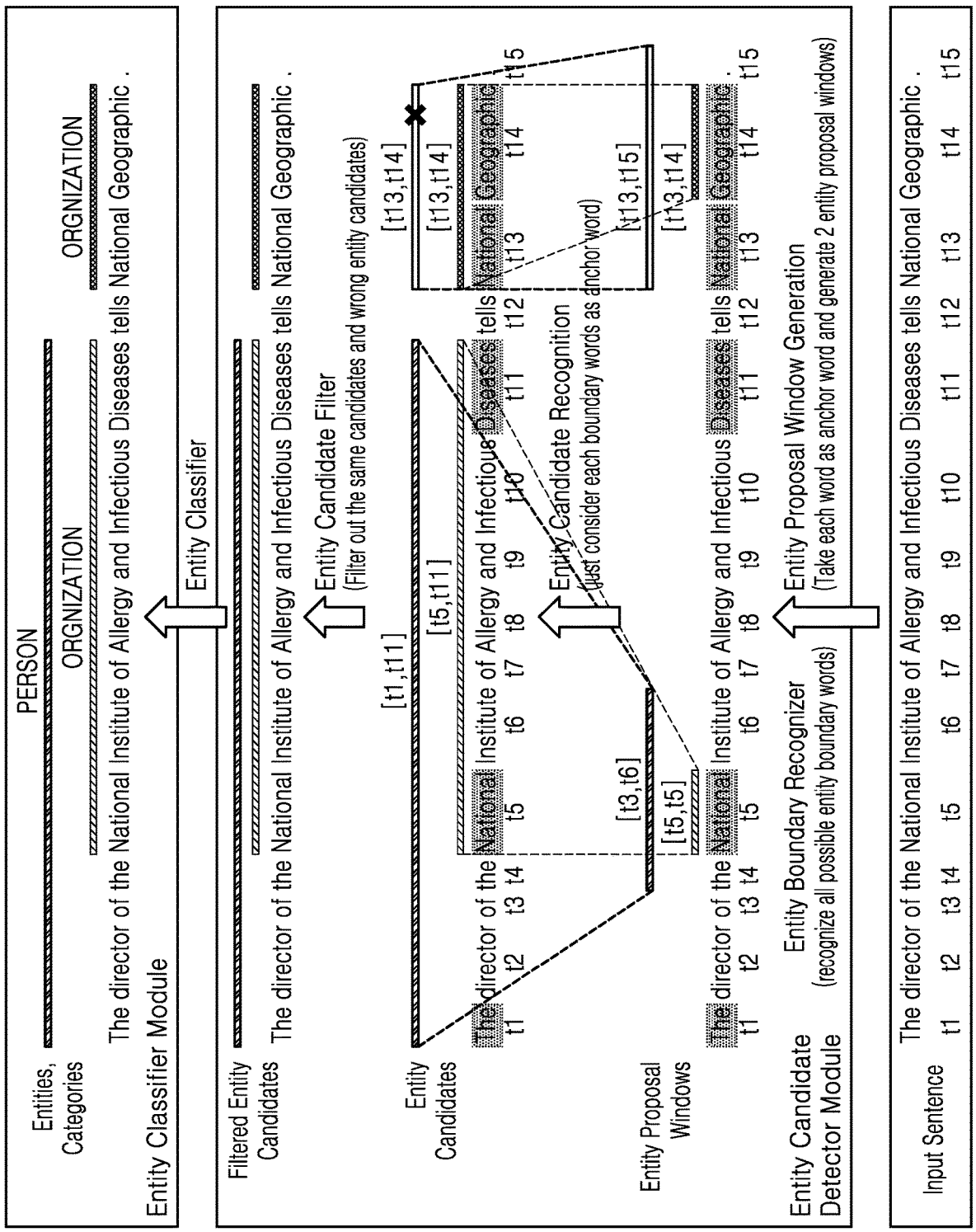
FIG. 9A is a schematic diagram of entity recognition according to an embodiment of the present disclosure.

The following uses an example to describe the overall process of the entity recognition method performed by the above model. FIG. 9A is a schematic diagram of entity recognition according to an embodiment of the present disclosure. As shown in FIG. 9A, the sentence "The director . . . Geographic" is input (see FIG. 9A for details). The entity recognition process may include the following steps:

Step 1. the sentence is input into the entity candidate detector module, and the entity candidate detector module uses the entity boundary recognizer layer to obtain possible entity boundary words in the sentence, such as "t1: The", "t5: National", "t11: Diseases", "t13: National", and "144: Geographic".

Step 2. the entity proposal window generation layer is used to generate entity proposal windows by taking a respective boundary word as the anchor word. When "t5: National" is used as the anchor word, the corresponding entity proposal windows are "[t5, t5]: National" and "[t4, t6]: the National Institute"; when "t14: Geographic" is used as the anchor word, the corresponding entity proposal windows are "[t14, t14]: National" and "[t13, t15]: National Geographic", and so on. Here, the disclosure may take two predefined entity proposals with widths of 1 and 3 as an example.

Step 3. then the entity proposal windows [t5, t5], [t4, t6], [t14, t14], and [t13, t15] are input into the entity candidate recognition layer, and are respectively used as the baseline for adjusting and predicting to obtain the entity candidate regions [t5, t11], [t1, t11], [t13, t14], and [t13, t14].

Step 4. the detected entity candidates are input into the entity candidate filter layer for filtering the wrong entities and duplicate entities to obtain [t5, t11], [t1, t11], and [t13, t14].

Step 5: the filtered entity candidates [t5, t11], [t1, t11], and [t13, t14] are input into the entity classifier to classify their entity categories. Finally, the entity and its category "[t5, t11]: PERSON", "[t1, t11]: ORGNIZATION", and "[t13, t14]: ORGNIZATION" are obtained.

Figure 9B:
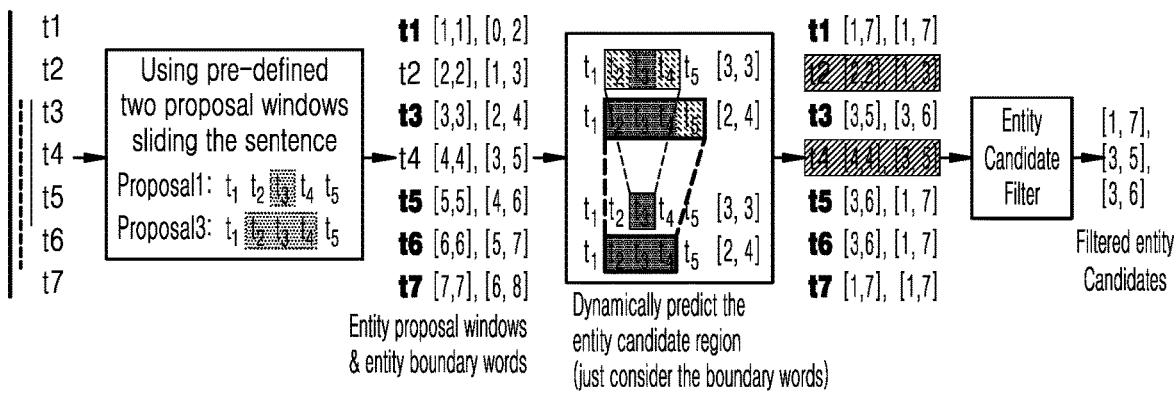
FIG. 9B is an entity candidate obtained in an embodiment of the present disclosure.
Figure 9C:
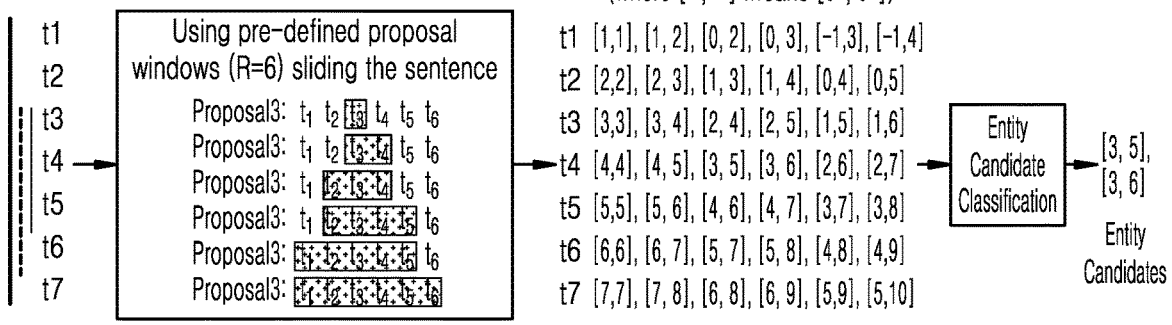
FIG. 9C is an entity candidate obtained in an example of the related art.

FIG. 9B is an entity candidate obtained in an embodiment of the present disclosure, and FIG. 9C is an entity candidate obtained in an example of the related art. The solution of the embodiment of the present disclosure (FIG. 9B) differs from the related art (FIG. 9C) mainly in the entity candidate generating module. As shown in the figures, there are two main differences as follows.

First, the number of predefined entity proposal windows are different. The method of the present disclosure only needs two different entity proposal windows (i.e., R=1, 3, two entity proposal windows with width 1 and 3). However, existing methods typically need to define multiple entity proposal windows (i.e., R=1, 2, 3, 4, 5, 6) to generate entities with different granularities.

Second, the usage of the predefined entity proposal window is different. The method of the present disclosure uses the generated entity proposal window as the entity candidate baseline to dynamically predict multi-granularity entity candidates, however, the related art method directly uses the entity proposal window as the entity candidate.

Each module of the above model in embodiments of the present disclosure will be described in detail below.

In an embodiment of the present disclosure, the acquiring at least one entity boundary word corresponding to a text sequence to be recognized includes: using all words in the text sequence to be recognized, respectively as entity boundary words; or based on a context representation vector of the word in the text sequence to be recognized, acquiring a probability of the word in the text sequence to be recognized being used as the entity boundary word, and based on the probability, determining the entity boundary word of the text sequence to be recognized.

Using all words in the text sequence to be recognized respectively as entity boundary words may correspond to the solution in Embodiment 1, in which each word in the text sequence to be recognized is regarded as an entity boundary word, and then subsequent processing is performed to determine the entity candidate region of the text sequence to be recognized. In this embodiment, some words are selected from the text sequence to be recognized as entity boundary words, and then subsequent processing is performed to determine the entity candidate region of the text sequence to be recognized.

In an embodiment, the entity boundary words of the text sequence to be recognized may be obtained through the entity boundary recognizer layer, that is, the module is used to detect the boundary words of all possible entities in the input text and generate a boundary word sequence. The design of this module is used in the subsequent entity candidate recognition module, so as to remove non-boundary word representations, realize the key and query matrix compression in the boundary attention calculation, and accelerate the speed of the entity candidate recognition module and reduce the calculation cost.

Figure 10:
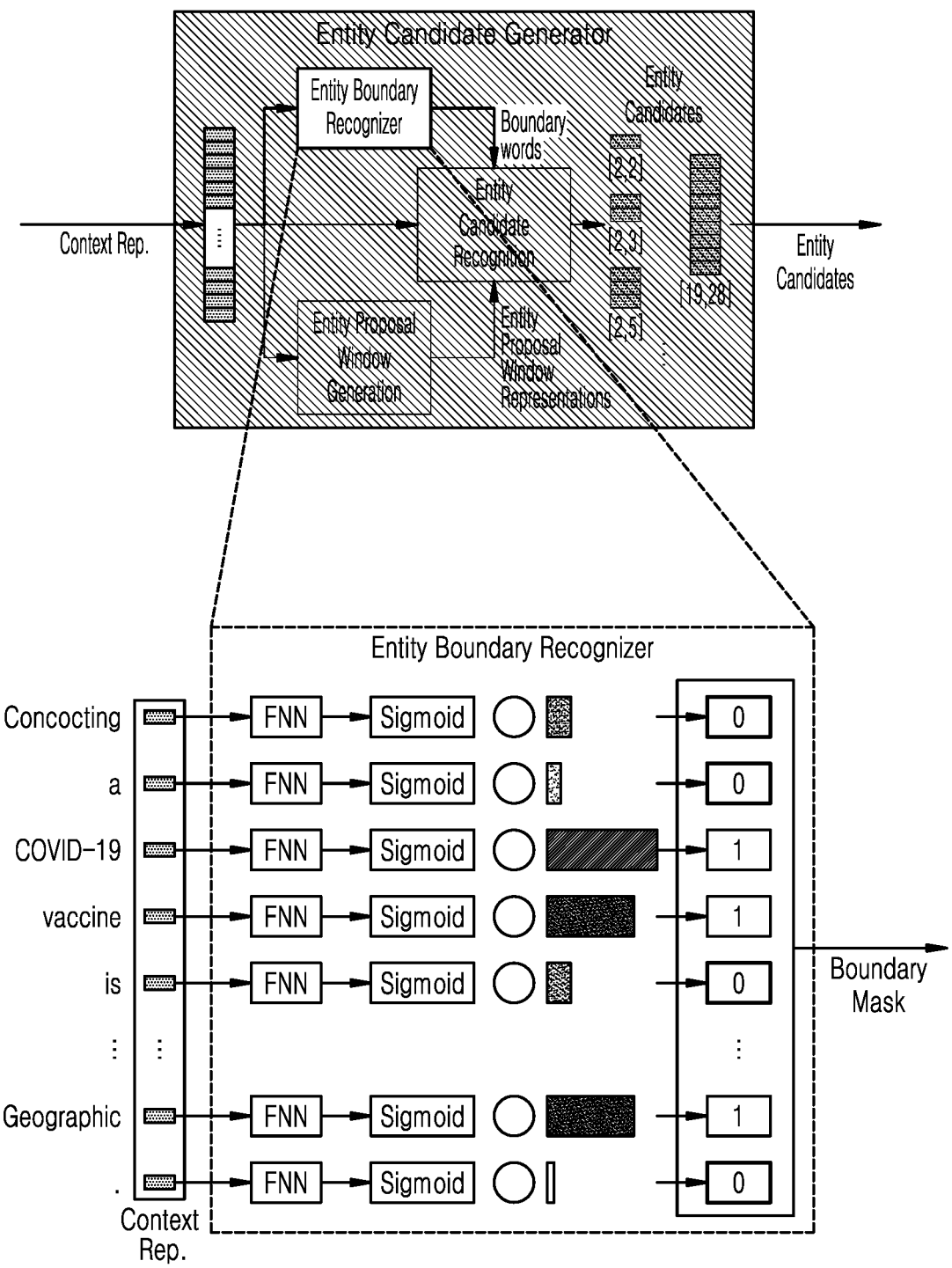
FIG. 10 is a schematic network structural diagram of the entity boundary recognizer layer according to an embodiment of the present disclosure.

FIG. 10 is a schematic network structural diagram of the entity boundary recognizer layer according to an embodiment of the present disclosure. As shown in FIG. 10, a schematic diagram of the entity boundary recognizer layer that acquires entity boundary words is illustrated. For the input sentence "The director of . . . National Geographic.", the entity boundary recognizer layer outputs entity boundary words as {"t2: director", "t5: National", "t11: Diseases", "t13: National", "t14: Geographic" }. The entity boundary recognizer layer may output a probability score $p_i \in [0, 1]$ for each word $t_i$ in the input sentence, which represents the probability that the word belongs to the boundary word. The process may include the following steps:

Step 1. for each word $t_i$, its context representation vector $u_i \in R^d$ is input into a fully connected neural network (FNN) to obtain a value $v_i$, that is, $v_i$=FNN($u_i$), where the parameter of FNN( ) is shared for all words.

Step 2: the value $v_i$ is converted into a probability value through the Sigmoid activation function, that is, $p_i$=Sigmoid ($v_i$).

Step 3. the boundary word is determined according to the probability value pi. Given that a boundary word threshold $\alpha \in (0,1)$ (e.g., the threshold may be set to 0.5), then, if $p_i > \alpha$, then the word belongs to the boundary word $mask_i$=1, otherwise the word does not belong to the boundary word $mask_i$=0.

Step 4, all entity boundary words in the sentence are output, that is, the entity boundary word mask sequence (mask) of the input sentence are output.

Figure 11A:
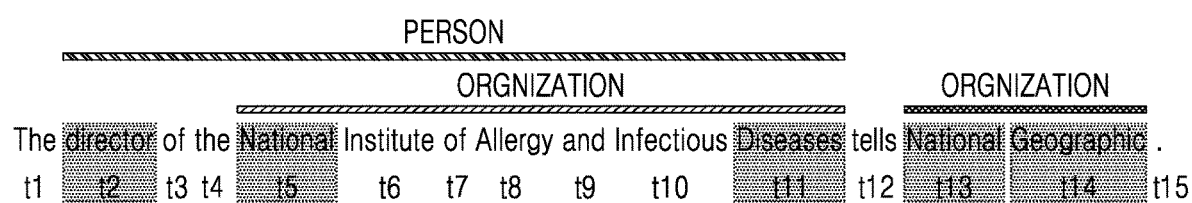
FIG. 11A is a schematic diagram of an example of entity boundary word detection according to an embodiment of the present disclosure.
Figure 11B:
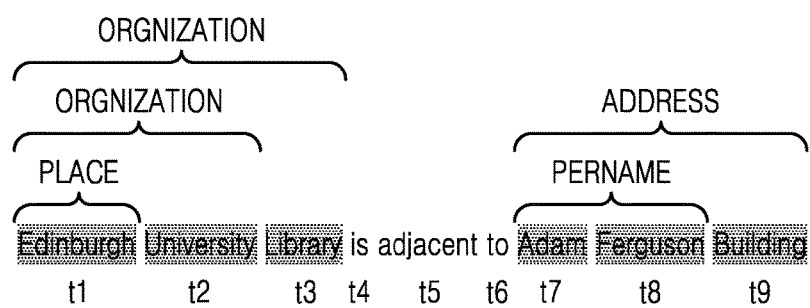
FIG. 11B is a schematic diagram of an example of entity boundary word detection according to an embodiment of the present disclosure.

In an embodiment, entity boundary word detection is for detecting all sets of possible nested entity boundary words. The boundary words of an entity include its start boundary words and end boundary words. FIGS. 11A and 11B are schematic diagrams of examples of entity boundary word detection according to an embodiment of the present disclosure. As shown in FIG. 11A, the detected entity boundary words are: {"t2: director", "t5: National", "t11: Diseases", "t13: National", "t14: Geographic" }. As shown in FIG. 11B, the detected entity boundary words are: {"t1: Edinburgh", "t2: University", "t3: Library", "t7: Adam", "t8: Ferguson", "t9: Building"}.

Further, the reasons why the entity boundary words in the sentence may be identified may be summarized into two aspects:

On the one hand, the entity boundary words in the sentence generally have certain rules, which may be found by matching some rules. The position of entity boundary words may be identified according to rules, such as dictionary, part of speech, prefix, suffix, etc. For example:

" . . . went to U.K . . . ", "U.K" is generally the start boundary word of the LOCATION entity;

" . . . party went to . . . ", "party" is generally the end boundary word of ORGNIZATION entity;

" . . . director of the . . . ", "director" is generally the start boundary word of the PERSON entity;

"# Noun Phrase tells", the word "tells" generally indicates that the previous word is the end boundary word of PERSON, where "# Noun Phrase" represents a noun phrase in the sentence;

If the prefix of a word is a lowercase letter and the prefix of the current word is an uppercase letter, then the current word is the start boundary word of an entity. For example: " . . . the National Institute . . . ", " . . . to Adam Ferguson Building . . . ";

If the prefix of the current word is an uppercase letter, and the prefix of the next word of the current word is a lowercase letter, then the current word is generally the end boundary word of an entity, for example: " . . . Diseases tells . . . ", " . . . University Library is . . . ";

For phrases that satisfy # Definite Article (which may be abbreviated as DT)+# Noun syntactic structure, the noun corresponding to # Noun (which may be abbreviated as NN) is generally the start word of an entity, where "# Definite Article" means definite article words, "# Noun" means nouns, this syntactic structure means that the definite article is connected to the noun, and in this syntactic structure, the definite article noun is generally the start word of an entity, such as "The/DT director/NN . . . ", "The" is the definite article, and the noun "director" followed by it is the start word of an entity.

Figure 12A:
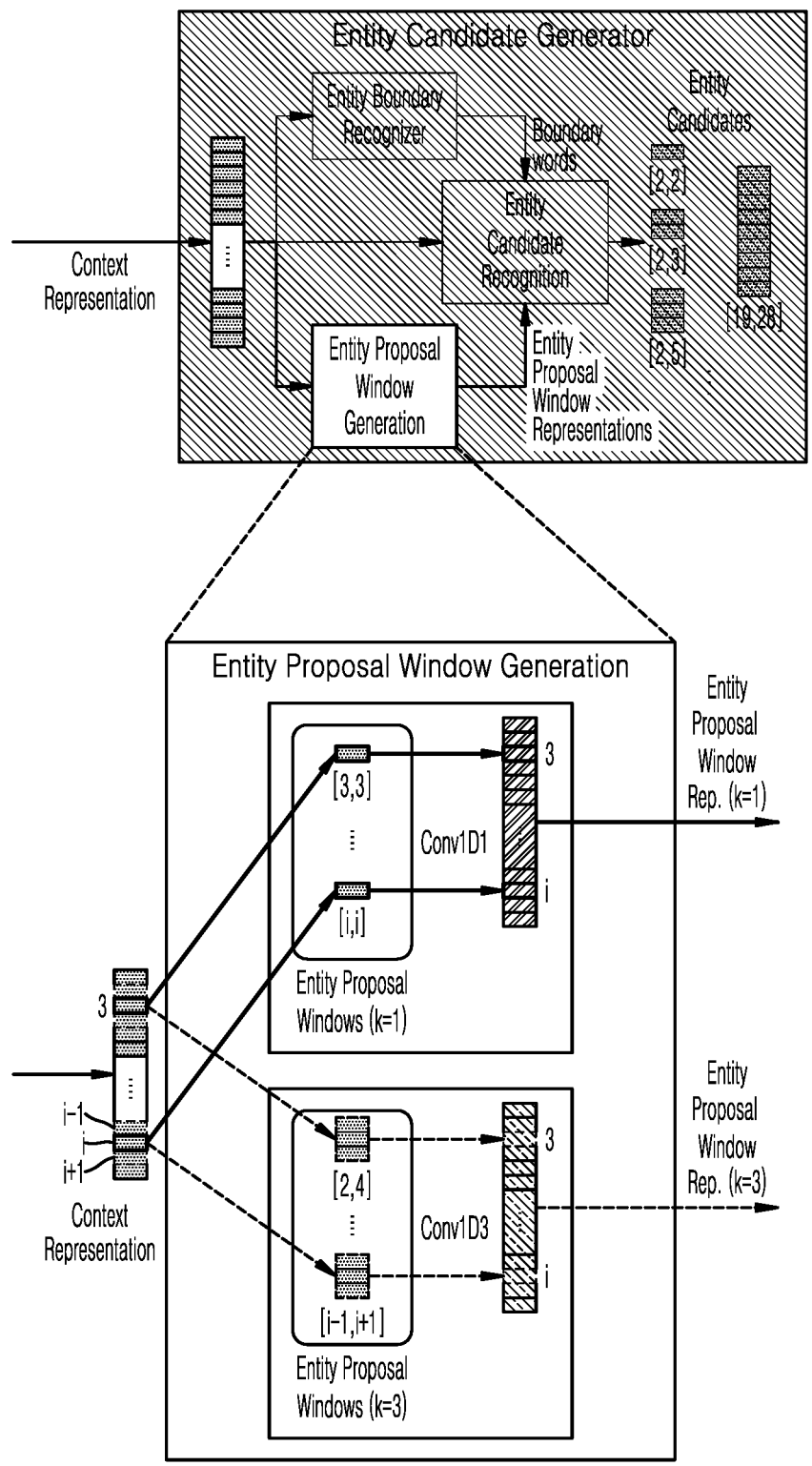
FIG. 12A is a schematic network structural diagram of an entity proposal window generation layer according to an embodiment of the present disclosure.

On the other hand, there are certain statistical rules for the entity boundary words in the sentence. As shown in Table 2 below, the statistical results of two nested entity recognition data sets ACE2004 and ACE2005 are given, which show the most frequent words appearing in different positions of the entity, and the most frequent part-of-speech rules for named entity recognition. It may be seen from Table 2:

Some words are frequently used as the start words of entities, such as "president", "North", "New", etc.;

Some words are frequently used as the end words of entities, such as "country", "company", "party", etc.;

According to the part-of-speech information of the text, many entity boundaries may be found through part-of-speech rules. "Determiner+Noun" means qualifier plus noun, "Preposition+Noun" means preposition connecting noun, and "Preposition+Proper Noun" means preposition connecting proper noun, "Verb+Noun" means a verb connecting a noun, and "Noun+Verb" means a noun connecting a verb.

predefined entity proposal windows with different lengths (i.e., preset widths). The generated entity proposal regions may be used as the entity region baseline to dynamically detect entity candidates with different granularities. The module may encode each entity proposal region according to the context representation of the word sequence. It should be noted that the preset width selected by this module may be one, two, or more. It should be understood that as the selected preset width is decreased, the obtained proposal region of the entity is decreased, and the amount of subsequent calculations is decreased. FIG. 12A is a schematic network structural diagram of an entity proposal window generation layer according to an embodiment of the present disclosure. As shown in FIG. 12A, a schematic diagram of the module (the entity proposal window generation layer) acquiring entity proposal regions is illustrated, for example, the following step 1 and step 2 may be included:

Step 1. the entity proposal window is used to generate all entity candidates for a given sentence.

Figure 12B:
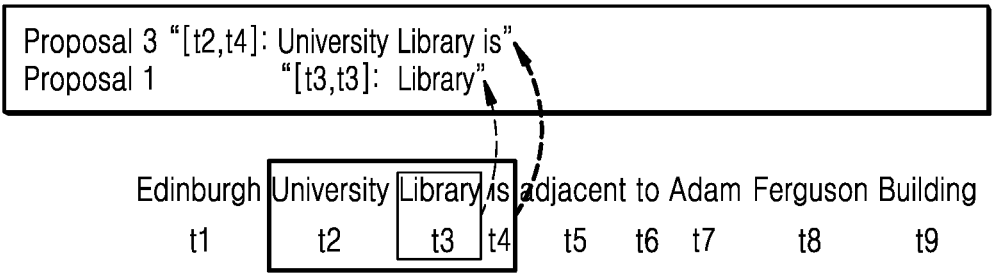
FIG. 12B is a schematic diagram of acquiring entity proposal regions according to an embodiment of the present disclosure.

FIG. 12B is a schematic diagram of acquiring entity proposal regions according to an embodiment of the present disclosure. For each word in the sentence, two different entity proposal regions of lengths 1 and 3 (that is, the entity proposal windows are 1 and 3) are generated, as shown in FIG. 12B, where the entity boundary word "t3: Library" is taken as the anchor word, the obtained entity proposal region is shown in the figure, that is, "[t3, t3]: Library" (corresponding to the preset width 1, Proposal 1) and "[t2, t4]: University Library is" (corresponding to the preset width 3, Proposal 3). Table 3 below shows the entity proposal regions generated for all possible entity boundary words.

TABLE 2

| The adjacent word before entity | Start boundary word | End boundary word | The adjacent word after entity | impossible as boundary | POS rules for NER |
|---|---|---|---|---|---|
| of | if | president | country | is | available | Determiner + Noun |
| in | between | Mr. | government | said | superstition | Prposition + Noun |
| and | what | reporter | president | has | grounds | Prepositioner+ Prper Noun |
| the | against | British | U.S. | think | thrown | Verb + Noun |
| to | 's | North | court | say | Incomes | Noun + Verb |
| that | after | coalition | state | know | windows | |
| for | says | Russian | world | from | outspoken | |
| by | where | military | States | forces | Until | |
| with | like | New | company | believe | in-box | |
| from | told | Republican | officials | reports | regulated | |
| said | about | former | troops | died | effort | |
| as | say | police | forces | work | give | |
| on | into | South | team | plans | cry | |
| " | over | reporter | city | kill | accounted | |
| at | an | mr. | police | decision | supplying | |
| " | near | Vice | Florida | policy | ate | |
| " | among | government | party | nation | heeding | |
| a | | presidential | coalition | action | graves | |

In an embodiment of the present disclosure, the acquiring an entity proposal region corresponding to the text sequence to be recognized based on the entity boundary word may include: based on at least one preset width, using the entity boundary word respectively as an anchor word to acquire corresponding entity proposal region having at least one preset width.

In an embodiment, the entity proposal region may be obtained through the entity proposal window generation layer. The module (or the entity proposal window generation layer) may generate a corresponding entity proposal region for each entity boundary word in the sentence through two Two symmetric entity proposal windows are generated by taking a respective anchor word as the center, and other asymmetric forms may also be used, for example, for the anchor word "t3: Library", the asymmetric window may be [t3, t4] or [t2, t5].

Generally, for the word t in the sentence, R kinds of entity proposal regions having different lengths may be generated, and R is the number of preset widths selected when generating the entity proposal region. In fact, a proposal window of two widths or even one width may be sufficient for nested entity recognition.

TABLE 3

| Anchor word | Entity Proposal Windows (k = 1) | Entity Proposal Windows (k = 3) |
|---|---|---|
| "t1: Edinburg" | "[t1, t1]: Edinburgh" | "[t0, t2]: Edinburgh University" |
| "t2: University" | "[t2, t2]: University" | "[t1, t3]: Edinburgh University Library" |
| "t3: Library" | "[t3, t3]: Library" | "[t2, t4]: University Library is" |
| "t7: Adam" | "[t7, t7]: Adam" | "[t6, t8]: to Adam Ferguson" |
| "t8: Ferguson" | "[t7, t8]: Ferguson" | "[t7, t9]: Adam Ferguson Builidng" |
| "t9: Building" | "[t9, t9]: Building" | "[t8, t10]: Ferguson Building" |

Step 2: the entity proposal region representations of all entity boundary words are obtained by sliding convolution operation on the sentence context representation matrix. In order to use the generated entity proposal region information in the subsequent modules, it needs to be encoded and the corresponding representation vector is obtained.

Proposal 1 (that is, the preset width is 1) and Proposal 3 (that is, the preset width is 3) are used to generate an entity proposal region for anchor words. The embodiment of the present disclosure introduces a local one-dimensional convolution Conv1D for performing convolution operation on each generated entity proposal region, and its output is used as its feature representation vector:

Regarding the entity proposal region representation of Proposal 1:

$$p_i = \text{Conv1D}_1(u_i),$$

Regarding the entity proposal region representation of Proposal 3:

$$p_i = \text{Conv1D}_3([u_{i-1}, u_i, u_{i+1}]),$$

$\text{Conv1D}_k$ represents a one-dimensional convolution operation with kernel width k, $u_{i-1}$, $u_i$, $u_{i+1}$ represent the context representation vectors for three words $t_{i-1}$, $t_i$, $t_{i+1}$ covered by the entity proposal region of Proposal 3 of the i-th word, respectively.

The scheme uses two convolution operations with different kernel widths to obtain the context representation vector of the entity proposal region for each entity boundary word in the sentence. The advantage of using convolution is that the context representation vector of the entity proposal region may be computed in parallel.

In the solution provided by the embodiment of the present disclosure, only two entity proposal windows (i.e., the preset widths) may be used to generate the entity proposal region, and then subsequent nested entity recognition with a multi-layer structure may be performed. The main reasons are as follows.

Taking FIG. 11B as an example, in general, the entity has a unique boundary word. Through these boundary words, all entity regions may be obtained under the two entity proposal windows, as shown in Table 4 below (the arrow direction in the table indicates the region expansion direction predicted by the entity candidate region):

1. Since "t1: Edinburgh" is an entity boundary word, the entity proposal regions obtained by taking this word as the anchor word are [t1, t1] and [t0, t2]. Entity candidates "Edinburgh" and "Edinburgh University" may be obtained by taking these two entity proposal regions as baselines through prediction.

2. Since "t8: Ferguson" is an entity boundary word, the entity proposal regions obtained by taking this word as the anchor word are "[t8, t8]: Ferguson" and "[t7, t9]: Adam Ferguson Building". It may obtain the entity candidate "[t7, t8]:" Adam Ferguson" by taking the entity proposal region [t8, t8] as a baseline through prediction, and obtain the entity candidate "[t7, t9]: Adam Ferguson Building" by taking the entity proposal region [t7, t9] as a baseline through prediction.

3. The entity candidate region "[t1, t3]: Edinburgh University Library" has not been detected under the above two boundary word operations, but the entity region has a unique entity boundary word "t3: Library", which may obtain two entity proposal regions [t3, t3], [t2, t4]. The entity candidate [t1, t3] may be obtained by taking one of these two proposal windows as a baseline.

TABLE 4

| Anchor word | Entity proposal regions | Detected entity |
|---|---|---|
| "t1: Edinburgh" | [t1, t1] | "[t1, t1]: Edinburgh" |
| | →[t0, t2] | "[t1, t2]: Edinburgh University" |
| "t2: University" | ←[t2, t2] | "[t1, t2]: Edinburgh University" |
| | [t1, t3] | "[t1, t3]: Edinburgh University Library" |
| "t3: Library" | ←[t3, t3] | "[t1, t3]: Edinburgh University Library" |
| | ←[t2, t4]← | "[t1, t3]: Edinburgh University Library" |
| "t7: Adam" | [t7, t7]→ | "[t7, t8]: Adam Ferguson" |
| | →[t6, t8] | "[t7, t8]: Adam Ferguson" |
| "t8: Ferguson" | →[t8, t8] | "[t7, t8]: Adam Ferguson" |
| | [t7, t9] | "[t7, t9]: Adam Ferguson Building" |
| "t9: Building" | ←[t9, t9] | "[t7, t9]: Adam Ferguson Building" |
| | ←[t8, t10] | "[t7, t9]: Adam Ferguson Building" |

In the solution provided by the embodiment of the present disclosure, one entity proposal window is sufficient to detect all nested entities in the sentence. That is, only one entity proposal window (i.e., the preset width) may be used to generate the entity proposal region, and subsequent nested entity recognition with a multi-layer structure may be performed. The main reasons are as follows.

Still taking FIG. 11B as an example, it can be seen that every entity generally has a unique boundary word. By taking a respective entity boundary word as an anchor word to generate the entity proposal region, it may be extended to the corresponding entity candidate region, as shown in Table 5 below. It may help to obtain a more stable model performance by using more entity proposal windows. However, using more entity proposal windows brings additional computational costs due to defining many entity proposal regions. Therefore, in order to balance model prediction performance and computational cost, two entity proposal windows may be selected, such as Proposal 1 with a width of 1, and Proposal 3 with a width of 3.

TABLE 5

| Anchor word | Entity proposal regions | Detected entity |
|---|---|---|
| "t1: Edinburgh" | [t1, t1] | "[t1, t1]: Edinburgh" |
| "t2: University" | ←[t2, t2] | "[t1, t2]: Edinburgh University" |
| "t3: Library" | ←[t3, t3] | "[t1, t3]: Edinburgh University Library" |
| "t7: Adam" | [t7, t7]→ | "[t7, t8]: Adam Ferguson" |
| "t8: Ferguson" | ←[t8, t8] | "[t7, t8]: Adam Ferguson" |
| "t9: Building" | ←[t9, t9] | "[t7, t9]: Adam Ferguson Building" |

In an embodiment of the present disclosure, the acquiring corresponding entity candidate region based on the entity proposal region, includes: determining a start boundary word candidate and an end boundary word candidate for the anchor word of the entity proposal region; determining the start boundary word of the entity proposal region among the start boundary word candidates, and the end boundary word of the entity proposal region among the end boundary word candidates; and determining the corresponding entity candidate region based on the obtained start boundary word and end boundary word.

The determining a start boundary word candidate and an end boundary word candidate for the anchor word of the entity proposal region, may include: determining the anchor word of the entity proposal region and the boundary word located on the left side of the anchor word as the start boundary word candidate for the anchor word; and determining the anchor word of the entity proposal region and the boundary word located on the right side of the anchor word as the end boundary word candidate for the anchor word.

The determining the start boundary word of the entity proposal region among the start boundary word candidates, and the end boundary word of the entity proposal region among the end boundary word candidates, may include: determining a first probability of a respective start boundary word candidate being as the start boundary word of the entity proposal region, and a second probability of a respective end boundary word candidate being as the end boundary word of the entity proposal region; and determining the start boundary word of the entity proposal region based on the first probability, and the end boundary word of the entity proposal region based on the second probability.

In other words, the acquiring corresponding entity candidate region based on the entity proposal region, may include: acquiring a corresponding combination vector based on the context representation vector of a word covered by the entity proposal region and a context representation vector of the corresponding anchor word; acquiring similarity between the context representation vector of the entity boundary word in the text sequence to be recognized and the combination vector; and acquiring the corresponding entity candidate region based on the similarity.

The acquiring similarity between the context representation vector of the entity boundary word in the text sequence to be recognized and the combination vector, may include: acquiring similarity between the context representation vector of the entity boundary word in the text sequence to be recognized and the combination vector in Euclidean space or hyperbolic space.

The acquiring the corresponding entity candidate region based on the similarity, may include: based on the similarity, determining a start boundary word of the corresponding entity candidate region from among the anchor word of the entity proposal region in the text sequence to be recognized and the entity boundary word located on the left side of the anchor word, and determining an end boundary word of the corresponding entity candidate region from among the anchor word of the entity proposal region in the text sequence to be recognized and the entity boundary word located on the right side of the anchor word; and determining the corresponding entity candidate region based on the start boundary word and the end boundary word.

In an embodiment, the anchor word of the entity proposal region in the text sequence to be recognized and the entity boundary word having the highest similarity among the entity boundary words located on the left of the anchor word are determined as the start boundary word of the corresponding entity candidate region, and the anchor word of the entity proposal region in the text sequence to be recognized and the entity boundary word having the highest similarity among the entity boundary words located on the right side of the anchor word are determined as the end boundary word of the corresponding entity candidate region. The corresponding entity candidate region is determined based on the start boundary word and the end boundary word.

In an embodiment, the entity candidate recognition layer may be used to obtain the entity candidate region based on the entity proposal region, and the layer dynamically predicts the boundary word position of the entity candidate region according to the entity proposal window. The entity candidate recognition layer may generate all entity candidates and their context representations. The entity proposal region is regarded as the baseline for obtaining entity candidate regions, rather than directly being used as the entity candidate region, which is different from the existing methods.

Figure 13A:
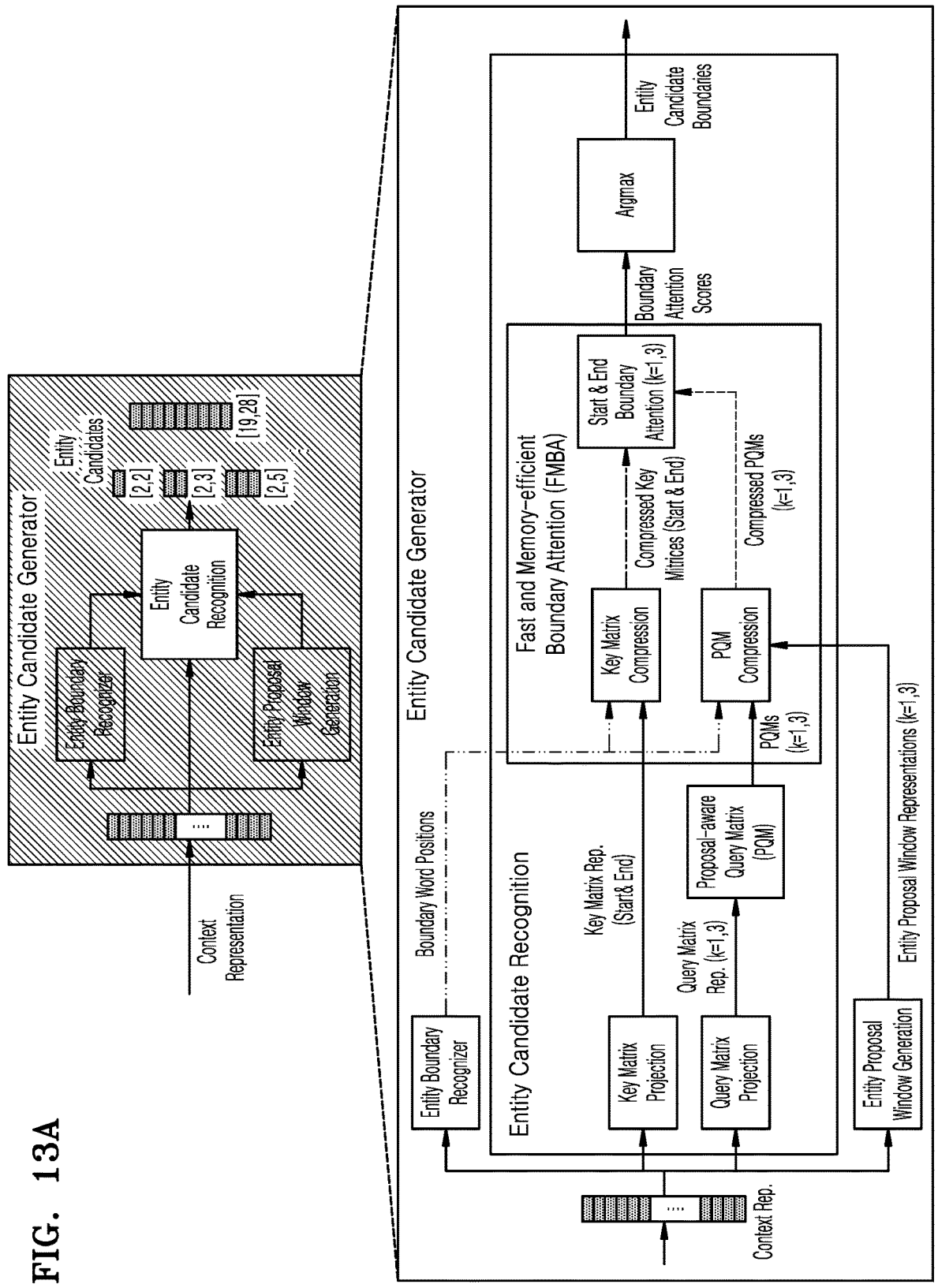
FIG. 13A is a schematic network structural diagram of an entity candidate recognition layer according to an embodiment of the present disclosure.

FIG. 13A is a schematic network structural diagram of an entity candidate recognition layer according to an embodiment of the present disclosure. As shown in FIG. 13A, the module (or the entity candidate recognition layer) uses a self-attention mechanism to predict the boundary word positions of all entity candidates. For example, the self-attention mechanism may include the following steps 1-5.

Step 1. key matrix transformation and query matrix transformation are obtained: the context representation matrix of the text to be recognized is transformed through two different linear transformations to obtain four new sentence representations (a sentence representation is a matrix, which contains the context representation feature vector of all words); that is, 1) key matrix representation (start and end), regarding the feature representation of the start boundary word and the end boundary word, a key matrix contains feature vectors for the key of each word; 2) query matrix representation (k=1, 3), i.e., the feature representations of two different proposal windows for each word.

Step 2, entity proposal-aware query matrix (PQM): perform a feature fusion of the query matrix representation (k=1, 3) and the different proposal window representation from the entity proposal window generation module.

Step 3-4, Fast and Memory-efficient Boundary Attention (FMBA): calculate the attention scores of each anchor word and all words in the sentence (normalized inner product scores). To avoid the high computation cost and high memory consumption of standard self-attention, the non-possible boundary parts of the key matrix and the entity proposal-aware query representation (PQM) are filtered out based on the boundary word mask obtained by the entity boundary detector.

Step 5: the boundary word position of the entity candidate is determined according to the boundary attention scores.

This module (or the entity candidate recognition layer) takes the entity proposal region as a baseline to dynamically predict the entity candidate region. A fast and memory-efficient boundary attention operation is designed to predict entity candidate boundaries, where in the boundary attention operation, only possible entity boundary words are considered instead of all words in the input sentence.

Figure 13B:
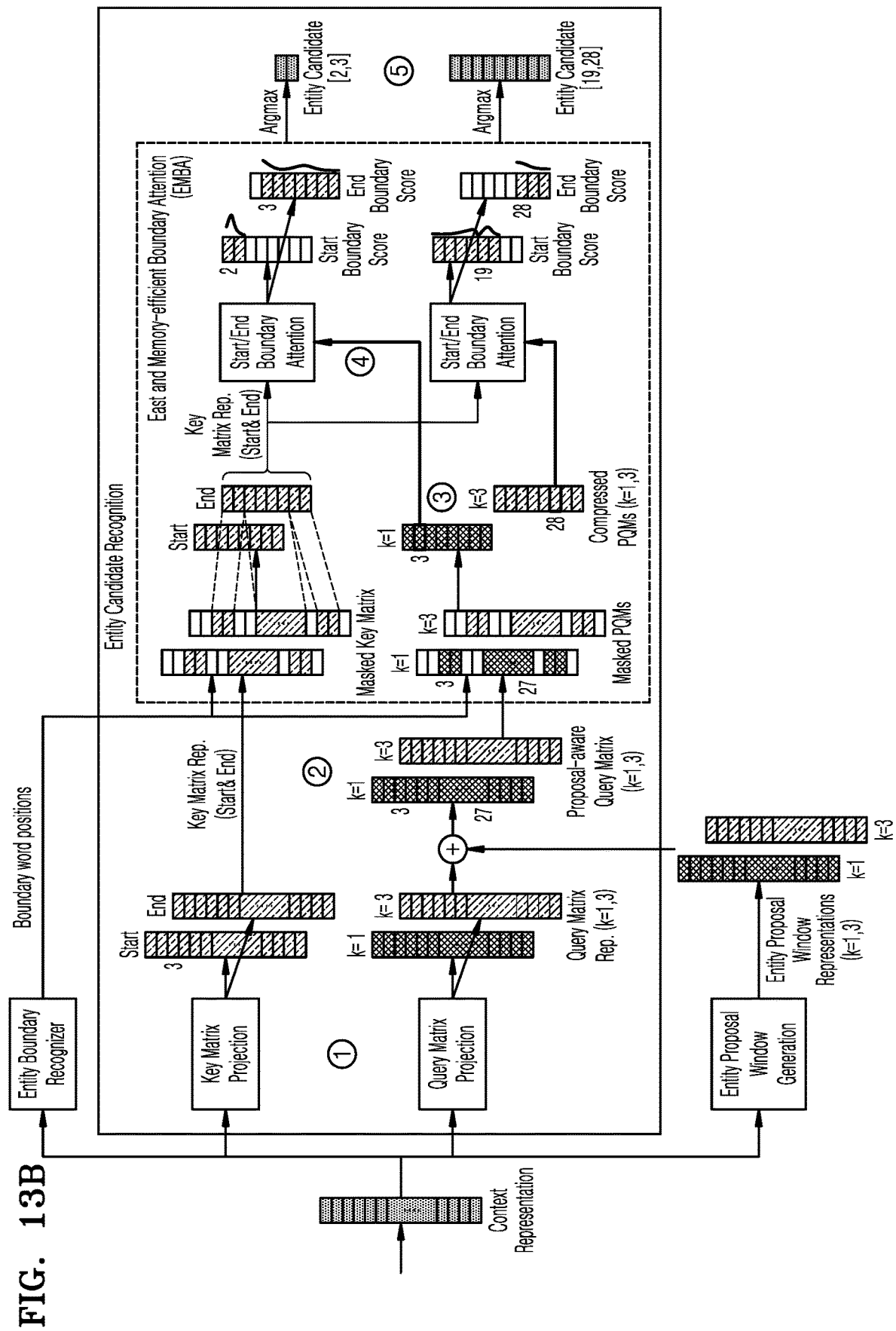
FIG. 13B is a detailed schematic network structural diagram of an entity candidate recognition layer according to an embodiment of the present disclosure.

FIG. 13B is a detailed schematic network structural diagram of an entity candidate recognition layer according to an embodiment of the present disclosure. FIG. 13B shows the detailed structure of the entity candidate recognition module, which mainly involves the calculation of 5 parts ①-⑤, as shown in FIG. 13B. The calculation process of the five parts is given below:

1. Key matrix representation and query matrix representation, which may be calculated by:

start key: $K_l = W_l U$;
end key: $K_r = W_r U$;
Query (k=1): $Q_1 W_1 U$;
Query (k=3): $Q_3 = W_2 U$.

$W_l$, $W_r$, $W_1$, $W_2$ are the weight parameter matrices, and U is the context representation from the sentence encoder layer.

2. The Proposal-aware Query Matrix (PQM), which takes the entity proposal window as the entity region baseline to predict the entity candidate boundary. The entity proposal-aware query matrix for Proposal 1 and the entity proposal-aware query matrix for Proposal 3 may be calculated by:

$$Q_1 \leftarrow Q_1 + \text{Conv1}D_1(U)$$

$$Q_2 \leftarrow Q_2 + \text{Conv1}D_3(U).$$

3. Compressed key matrix and compressed PQM: of which calculation includes two steps: 1) the boundary mask M from the entity boundary detector is respectively multiplied with the key matrix representation $K_l$, $K_r$ and the entity proposal-aware query matrix $Q_1$ and $Q_2$; 2) the original key matrix representation $K_l$, $K_r$ and the entity proposal-aware query matrix $Q_1$ and are compressed by filtering the vectors of non-boundary words based on boundary musk, where the compressed matrix is denoted as $\hat{K}_l$, $\hat{K}_r$ and $\hat{Q}_1$, $\hat{Q}_2$.

4. Start and end boundary attention operations: for compressed PQM$\hat{Q}_1$, the vector $q_i$ from $\hat{Q}_1$ or $\hat{Q}_2$ is taken as the anchor word (query), and the attention operation is used to calculate the start boundary and end boundary scores with respect to $\hat{K}_l$, $\hat{K}_r$, $$s_{li} = \text{Softmax}(\langle q_i, K_l \rangle), s_{ri} = \text{Softmax}(\langle q_i, \hat{K}_r \rangle))$$

where $\langle \cdot, \cdot \rangle$ represents the calculation of the similarity score between two vectors. The disclosure may use the similarity metric in the Euclidean space, or the similarity metric based on the non-Euclidean space, such as the similarity induced by taking hyperbolic distance in the hyperbolic space; in Euclidean space or hyperbolic space, the disclosure may obtain the similarity scores between the context representation vectors of the entity boundary words in the text sequence to be recognized and the query vector, and then obtain boundary scores according to the similarity scores.

5. Determine the entity boundary word position of the entity candidate: for the feature vector $q_i$ from $\hat{Q}_1$ or $\hat{Q}_2$, the key word having the largest attention score is taken as the boundary word, and the start boundary word and end boundary word positions are calculated as follows:

$$l_i = \underset{j \leq i}{\text{argmax}}\, s_{li}, \quad r_i = \underset{j \geq i}{\text{argmax}}\, s_{ri}.$$

The obtained prediction entity candidate region is [$l_i$, $r_i$] $l_i$ is the position of the start boundary word, and $r$ is the position of the end boundary word.

Further, the most direct boundary attention operation has self-attention operations $K_s^T Q_k$, $K_e^T Q_k$ with $O(N^2 d)$ time and memory complexity, where N is the length of the input sequence, and d is feature vector dimension of K, Q. This operation has a quadratic relationship with respect to the length of the input sequence, which leads to high computation and memory cost so that the operation is not efficient to scale to the long text sequence. In order to solve these challenges, a fast and memory-efficient boundary attention operation (FMBA) to calculate the boundary scores of entity candidates is proposed.

Figure 13C:
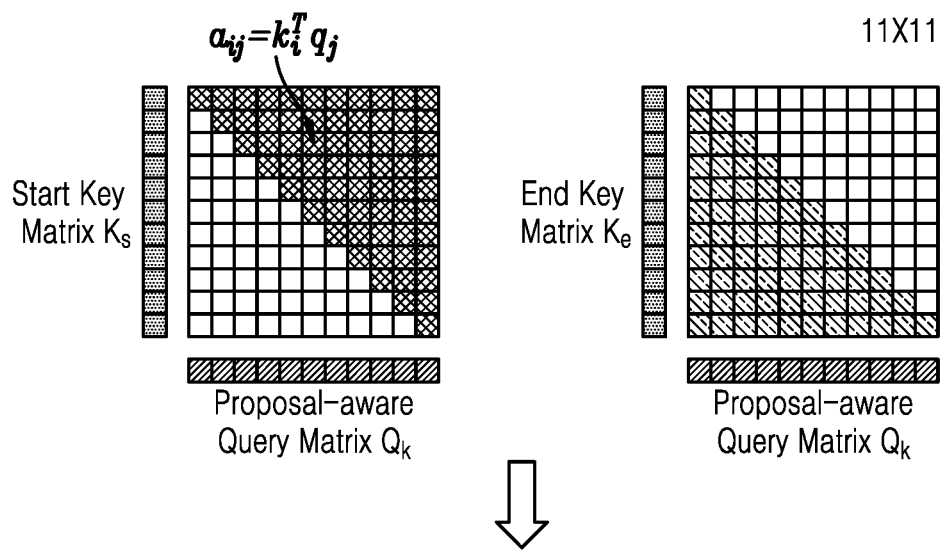
FIG. 13C is a comparison diagram of boundary word mask-based boundary attention calculation and general boundary attention calculation according to an embodiment of the present disclosure.
Figure 13C:
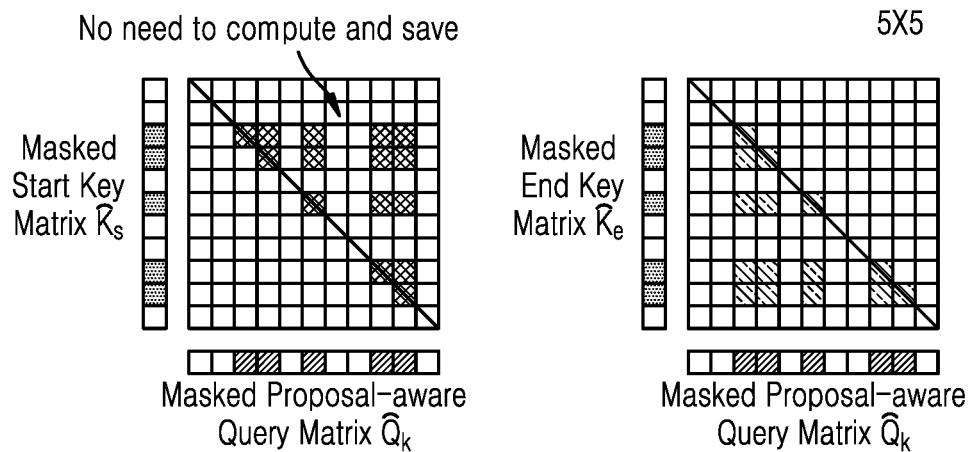

FMBA designs sparse attention operations based on detected boundary words. FIG. 13C is a comparison diagram of boundary word mask-based boundary attention calculation and general boundary attention calculation according to an embodiment of the present disclosure. As shown in FIG. 13C, the disclosure firstly considers the boundary words to compress the query and key matrix, and then calculates the boundary attention operation, which include the followings:

Compressed key matrix and entity proposal-aware query matrix: since FMBA is to find the two boundary word positions of each entity candidate, it only needs to calculate the attention score between boundary words. The non-boundary word parts in the start and end key matrix $K_s$, $K_e$ and query matrix $Q_k$(k=1, 2) may be filtered out based on the boundary word mask to get the corresponding compressed matrix $\hat{K}_s$, $\hat{K}_e$, $\hat{Q}_k$.

Calculate the attention score through the compressed key matrix and query matrix: it may calculate $\hat{K}_s^T \hat{Q}_k$, $\hat{K}_e^T \hat{Q}_k$ instead of $K_s^T Q_k$, $K_e^T Q_k$ on the boundary words. If the number of possible boundary words in the input sentence is $\hat{N}$, the time and memory complexity of FMBA is $O(\hat{N}^2 d)$. Since boundary words are generally much less than the sentence sequence length $\hat{N} \ll N$, it may significantly reduce the computation cost and memory cost of the boundary attention operation in inference process.

This scheme designs a fast and memory-efficient boundary attention operation module to calculate the boundary score matrix, which reduces the computational complexity from $O(N^2 d)$ to $O(\hat{N}^2 d)$, where $\hat{N} \ll N$.

In an embodiment of the present disclosure, the acquiring entity recognition result for the text sequence to be recognized based on the entity candidate region, includes: filtering the entity candidate regions to obtain filtered entity candidate regions; classifying category of the filtered entity candidate region to obtain the entity recognition result for the text sequence to be recognized.

The filtering the entity candidate regions to obtain filtered entity candidate regions, includes: acquiring a corresponding first classification feature vector based on the context representation vector for the word covered by the entity candidate region; acquiring a probability of the entity candidate region belonging to an entity based on the first classification feature vector corresponding to the entity candidate region; and acquiring the filtered entity candidate region based on the probability of the entity candidate region belonging to the entity.

Figure 14:
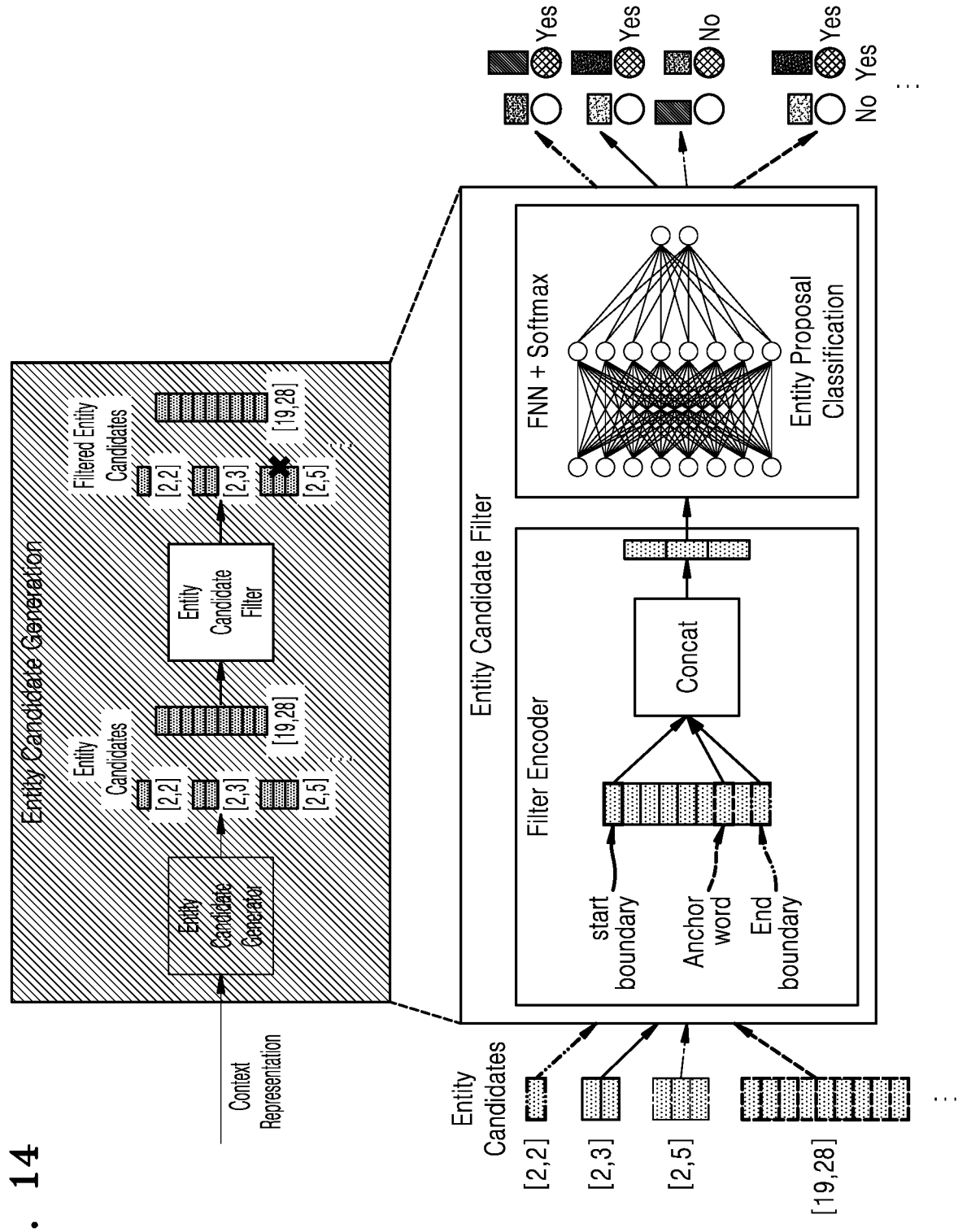
FIG. 14 is a schematic network structural diagram of an entity candidate filter layer according to an embodiment of the present disclosure.

In an embodiment, the entity candidate filter layer may be used to filter the entity candidate regions obtained by the previous module to obtain the filtered entity candidate region. The module (that is, the entity candidate filter layer) simultaneously and in parallel estimates a probability that each entity candidate belongs to the entity, and filters the generated entity candidates according to the probability. FIG. 14 is a schematic network structural diagram of an entity candidate filter layer according to an embodiment of the present disclosure. As shown in FIG. 14, the entity candidate filter layer may filter out those entity candidates that are unlikely to be the correct entities. The module first encodes a respective entity candidate into a fixed-dimensional feature vector, and then inputs it to a binary classifier to determine whether the entity candidate belongs to a real entity. This module includes two components: an entity candidate encoder layer and an entity candidate category classification layer.

The entity candidate encoder layer encodes all entity candidates with different lengths into fixed-dimensional feature vectors. For the entity candidate region [$l_i$,$r_i$] plus its corresponding anchor word $t_i$, the module uses three components to encode the entity candidate, including the start word feature vector $u_{l_i}$, the end word feature vector $u_{r_i}$, and the anchor word feature vector $u_i$. The feature encoded by the entity candidate region [$l_i, r_i$] (i.e., the first classification feature) may be expressed as:

$$h_i = \text{Concat}(u_{l_i}, u_{r_i}, u_i),$$

That is, three feature vectors are concatenated;

In the entity candidate category classification layer, a fully connected layer (FNN) with two-class Softmax may be used to determine the quality of entity candidates and filter wrong entity candidates. The probability of entity candidates may be defined as:

$$p_i = \text{Softmax}(\text{FNN}(h_i))$$

Different from the related art method using CNN/LSTM to encode entity candidates, the entity candidate encoder layer of this scheme only takes the concatenation of three components of the entity candidates, i.e. the feature vectors of the start boundary word, end boundary word, and anchor word (that is, the context representation vectors). This operation is very efficient and accelerates model inference.

Figure 15:
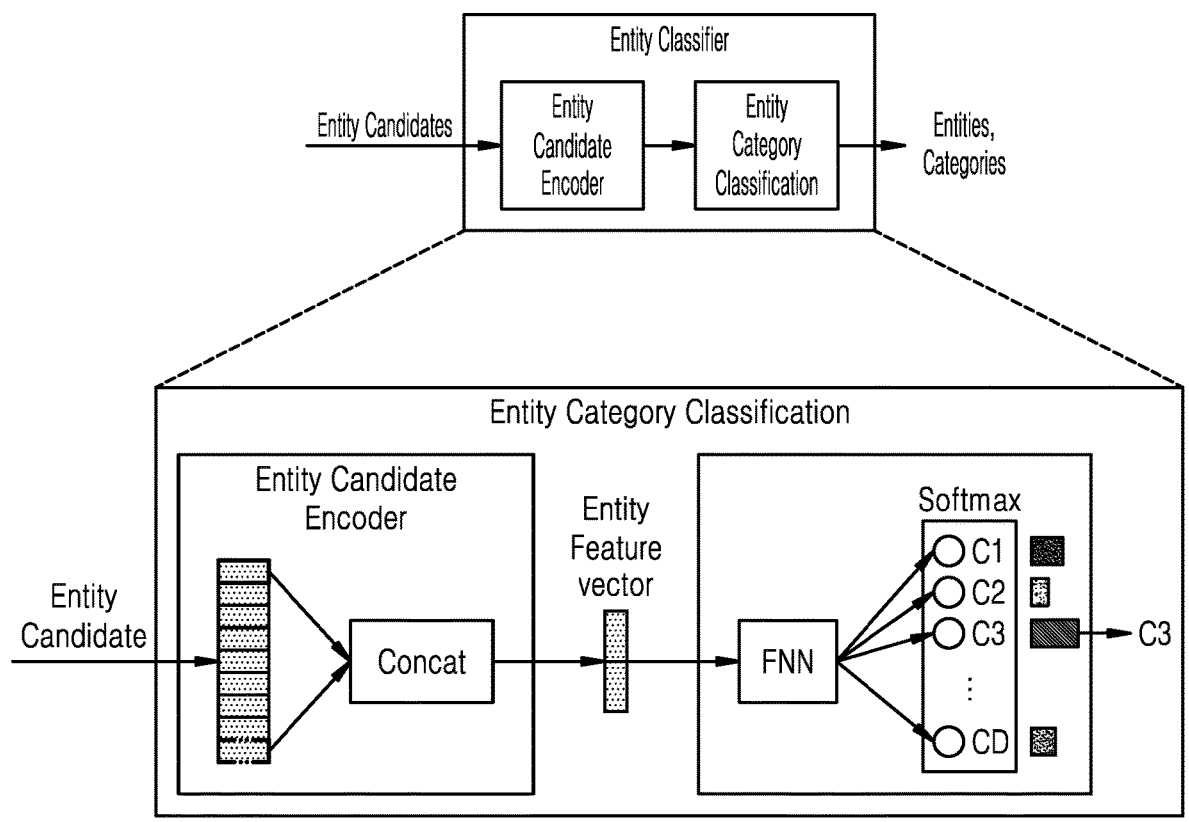
FIG. 15 is a schematic network structural diagram of an entity classifier module according to an embodiment of the present disclosure.

The classifying category of the filtered entity candidate region to obtain the entity recognition result for the text sequence to be recognized, includes: acquiring a corresponding second classification feature vector based on the context representation vectors for the start boundary word and the end boundary word corresponding to the filtered entity candidate region; and classifying category of the filtered entity candidate region based on the second classification feature vector to obtain the entity recognition result for the text sequence to be recognized In an embodiment, the entity classifier module may be used to classify the filtered entity candidate regions. FIG. 15 is a schematic network structural diagram of an entity classifier module according to an embodiment of the present disclosure. As shown in FIG. 15, the entity classifier module firstly encodes each filtered entity candidate (i.e., the filtered entity candidate region), and then classifies them into different predefined entity categories, upon which the final predicted entity is determined.

This module (or the entity classifier) encodes each filtered entity candidate to obtain a fixed-dimensional feature vector, and then inputs it to a fully connected network with Softmax output layer for classifying entity category. The module includes two sub-modules:

Entity candidate encoder layer: which encodes entity candidates with different lengths into fixed-dimensional feature vectors. For each entity candidate interval m=[l, r] its feature vector is defined as the concatenation of two boundary word feature vectors:

$$m = \text{Concat}(u_l, u_r)$$

The encoder structure is simple and effective, and other existing methods such as CNN/LSTM may also be used as an entity candidate encoder layer.

Entity category classification layer: which classifies entity candidate categories based on the feature vector m obtained by the entity candidate encoder layer. The entity classifier network module is defined as:

$$p = \text{Softmax}(\text{FNN}(m))$$

where the fully connected neural network (FNN) may be:

$$\text{FNN}(m) = W_2 \text{ReLU}(W_1 m),$$

Here, $W_1 \in R^{2D \times H}$, $W_2 \in R^{C \times D}$ are the network parameters that need to be learned, D is the number of predefined entity categories, including non-entity category None_Type, and ReLU( ) is an activation function.

Different from the related art method, this scheme encodes each entity candidate based on the entity candidate representation from the entity candidate encoder layer, rather than the raw word sequence and the input sentence. This end-to-end approach may not only reduce error propagation, but also speed up online model inference. Additionally, the module only takes the concatenation of two boundary word feature vectors of the entity candidate as its entity feature vector. This operation is efficient without any computation cost which is also helpful for inference acceleration.

Figure 16:
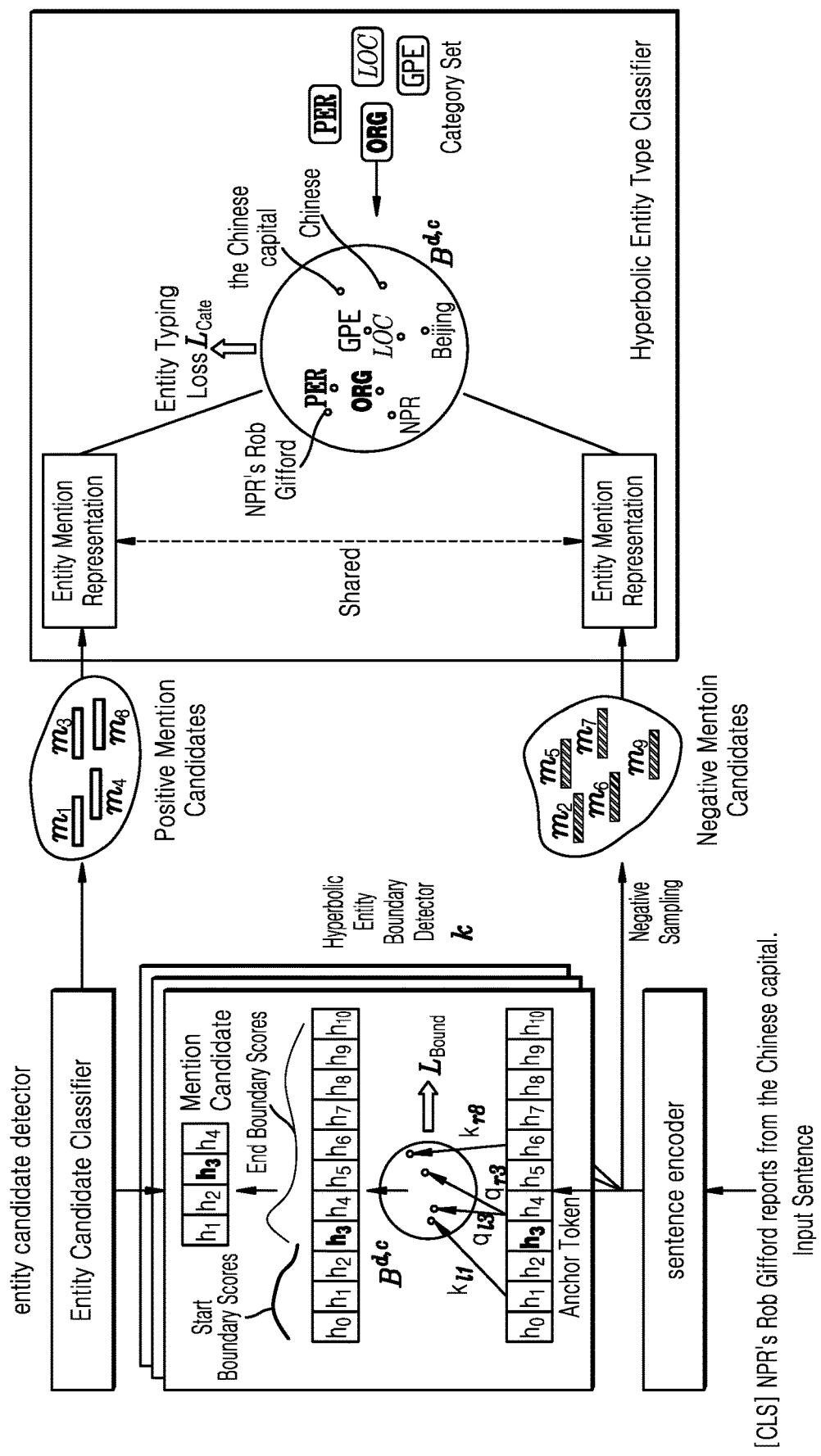
FIG. 16 is a schematic diagram of hyperbolic space-based entity recognition solution according to an embodiment of the present disclosure.

In addition, the boundary attention operation is performed on the entity candidate recognition layer, that is, the similarity calculation may be performed in the hyperbolic space. FIG. 16 is a schematic diagram of hyperbolic space-based entity recognition solution according to an embodiment of the present disclosure. As shown in FIG. 16, the entity boundary detection is based on the similarity scores induced by the hyperbolic distance.

FIG. 16 illustrates a hyperbolic entity proposal network architecture for nested entity recognition, which includes two neural network modules: an entity candidate detector module and a hyperbolic entity classifier module. The entity candidate detector module is to identify possible entity regions by calculating multi-head attention scores in the hyperbolic space, and then generate entity candidate regions. This module may be further divided into three modules, that is, the sentence encoding layer (i.e., the sentence encoder layer in the figure), and the hyperbolic space-based candidate generating layer (i.e., the hyperbolic space-based candidate generator in the figure) and entity candidate category classification layer (i.e., entity candidate classifier in the figure). In an embodiment, the sentence encoder layer may obtain the context representation of each word through a bidirectional long-short term memory module (Bi-LSTM), a convolutional neural network (CNN), and a pre-trained language model (such as BERT). The candidate generator generates entity candidate regions based on the attention scores (i.e., similarity) of different heads. It is different from calculating the multi-head attention scores in the Euclidean space, here, the similarity between the anchor word and respective words may be calculated in the hyperbolic space, the similarity induced by hyperbolic distance is used to replace the similarity calculation in Euclidean space. The method of calculation in hyperbolic space may help the model learn alignments of words with hierarchical structure. The entity candidate category classification is a two-class neural network layer, which determines a probability of the generated entity candidate region belonging to the entity category, and filters the region candidates based on the probability. This layer may perform calculation in Euclidean space or in hyperbolic space. The generated entity candidate regions are filtered. The hyperbolic entity classification module is to classify the detected entity candidate regions based on the predefined entity categories. The module includes two parts: an entity candidate encoder layer, which encodes the filtered entity candidates in the hyperbolic space; an entity category classification, which classifies the filtered entity candidate regions obtained in the previous step into the appropriate entity category.

It should be noted that the network uses both positive entity candidates (such as m1, m3, m4, m8 in the figure) and negative entity candidates (such as m2, m5, m6, m7 in the figure) as training samples in the training process. The positive entity candidate may be understood as a filtered entity candidate, that is, the positive entity candidate belongs to an entity, and is labeled a specific entity type, while the negative entity candidate does not belong to an entity. The network parameters of the entity candidate encoder layer obtained by training the positive entity candidate and the negative entity candidate separately may be shared. By adding negative entity candidates in the training process, it may help to improve the ability of the hyperbolic entity classifier classifying entity categories.

A hyperbolic distance-induced similarity calculation function may be defined as:

$$K(q_h, k_h) = -\alpha_h d^c(q_h, k_h)^2 + \beta_h$$

Where $$d^c(x, y) = \frac{2}{\sqrt{c}} \text{arctanh}(\sqrt{c} \|-x \oplus^c y\|)$$

is the hyperbolic distance, $x \oplus^c y$ represents the addition operation in the hyperbolic space, and its calculation is as follows:

$$x \oplus^c y = \frac{c_1 x + c_2 y}{1 + 2cx^T y + c^2 \|x\|^2 \|y\|^2},$$

Correspondingly, for the entity classifier network module, since there is a significant conceptual hierarchy in nested entities, we may define a classifier in hyperbolic space. First, the predefined category set C={c1, c2, . . . , cT}+{None_Type} is mapped to a feature vector space, and an embedding vector corresponding to category c is defined as $y_c \in R^D$. The classifier may be defined as follows: given that $h_m$ is the feature representation of a given entity candidate m, and its classifier is defined as:

$$p_{m,c} = \frac{\exp(-K(e_m, y_c))}{\sum_{c \in C} \exp(-K(e_m, y_c))}$$

Where $e_m \in R^D$ represents the D-dimensional feature representation vector of entity candidate m obtained through a nonlinear transformation FNN( ), that is:

$$e_m = \text{FNN}(h_m)$$

where $y_c$ represents the embedding vector of category $c \in C$. $p_{m,c}$ represents the probability of entity candidate m with respect to category c, and the category with the highest probability is used as the predicted entity category during model prediction.

Hyperbolic space-based entity category classification layer may replace the parameters, operations, and similarity in the entity category classification layer of Euclidean space with the parameters, operations, and similarity in the hyperbolic space. Given an entity candidate m, then the representation vector of the entity candidate may be as follows:

$$e_m = (W_2 \otimes_c \psi^{\otimes c}(W_1 \otimes_c h_m \otimes_c b_1)) \otimes_c b_2$$

Here, $W_1 \in \mathbb{R}^{2D \times H}$, $W_2 \in \mathbb{R}^{d \times H}$ are the network fully connected parameters, $b_1$ and $b_2$ represent the bias parameters, $\psi^{\oplus c}$ represents the activation function in the hyperbolic space, and $\oplus_c$ is the Mobius addition operation. If C represents a category set containing None, the probability that the entity candidate m belongs to category c is:

$$p_{m,c} = \frac{\exp(-K(e_m, y_c))}{\sum_{c \in C} \exp(-K(e_m, y_c))}$$

Where $K(e_m, y_c)$ is the hyperbolic distance-induced similarity. Note that it is different from the inner product operation in Euclidean space.

Embodiment 3

In an embodiment, the acquiring at least one entity candidate region in the text sequence to be recognized based on the at least one entity boundary word, includes: taking each boundary word as anchor word (or query word); acquiring a preset number of entity boundary words adjacent to the anchor word from the text sequence to be recognized; acquiring the similarity between the context representation vector of the anchor word and the context representation vectors of the corresponding adjacent preset number of entity boundary words, respectively; acquiring the corresponding entity candidate region based on the similarity. Based on the similarity, determining respectively the start boundary word and the end boundary word of the corresponding entity candidate region from among the anchor word of the text sequence to be recognized and the preset number of entity boundary words adjacent to the anchor word; and determining the corresponding entity candidate region based on the start boundary word and the end boundary word. In an embodiment, in this scheme, after the entity boundary words are obtained, the start boundary words and end boundary words of the entity candidate region are determined directly based on the entity boundary words, and then the corresponding entity candidate region is obtained.

Figure 17:
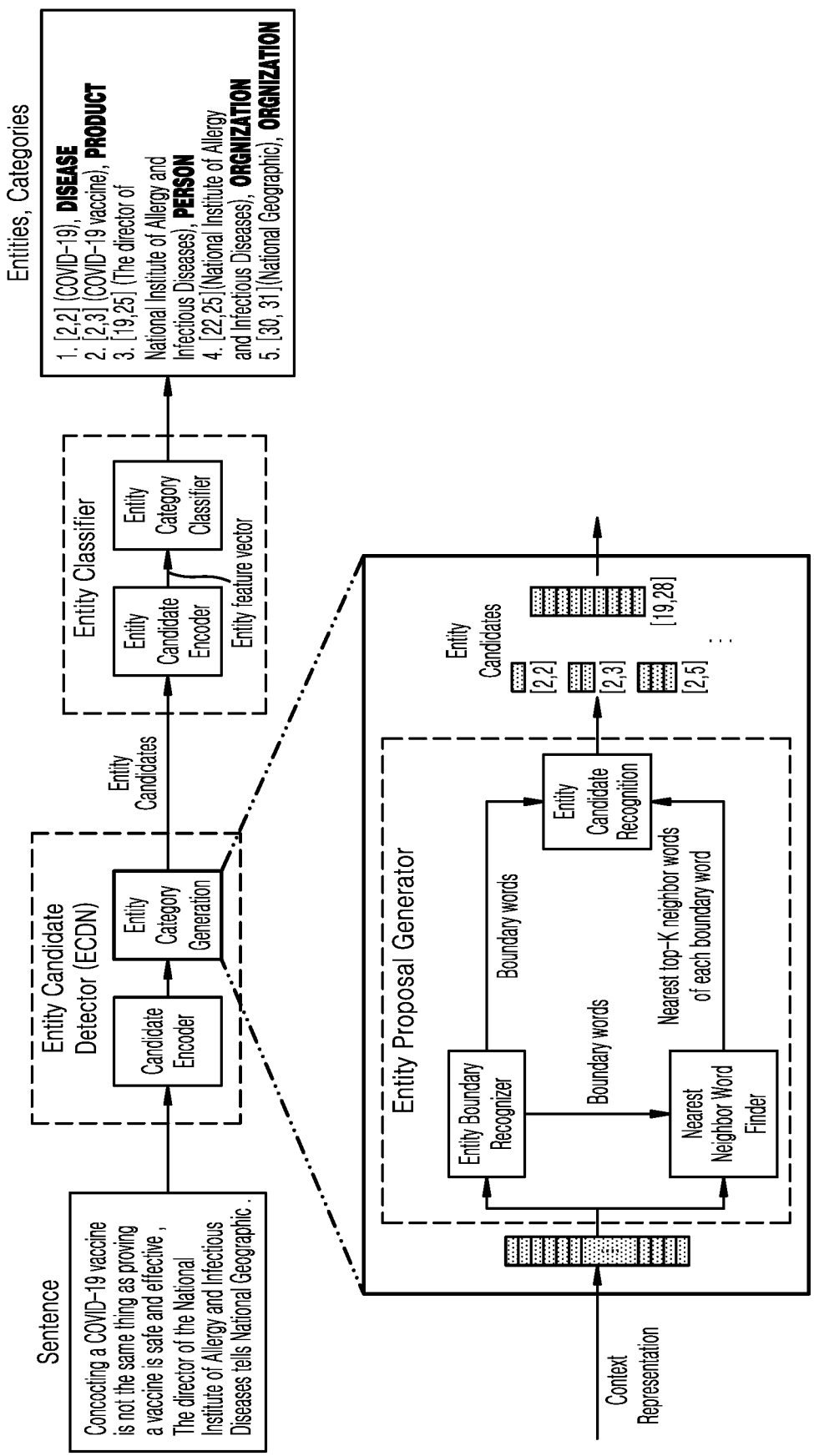
FIG. 17 is a schematic structural diagram of an entity recognition network model according to an embodiment of the present disclosure.

FIG. 17 is a schematic structural diagram of an entity recognition network model according to an embodiment of the present disclosure. As shown in FIG. 17, the model implementing this scheme of Embodiment 3 differs from the models in Embodiments 1-2 mainly in the entity candidate detector module. The entity candidate detector module in this scheme includes the entity boundary recognizer layer, the nearest neighbor word finder layer, and entity candidate recognition layer, which are described in detail below.

1. The entity boundary recognizer layer. This module detects possible entity boundary words in the input text sequence, which is consistent with the entity boundary recognizer layer in Embodiments 1-2.

2. The nearest neighbor word finder layer. The module takes the detected entity boundary words as anchor words, and then uses Local Sensitive Hash technology to find each entity boundary word and its top-K nearest neighbor words (K<<L, where L is the length of the text sequence to be recognized).

3. The entity candidate recognition layer, which calculates the similarity score between each anchor word and its top-K nearest neighbor entity boundary words, and combines the anchor word with the neighbor entity boundary word having the largest similarity score to form the entity candidate boundary word pair, i.e. start boundary word and end boundary word.

The execution process of the nearest neighbor word finder layer and entity candidate recognition layer are repeated H times (e.g., H=2). Finally, all entity candidates are collected and output.

The main difference between this scheme and that in Embodiment 2 lies in the entity candidate detector module. In Embodiment 3, the entity candidate detector module does not need a pre-defined entity proposal window and the entity candidate generator in the entity candidate detector is replaced with the nearest neighbor word finder module. Accordingly, the entity candidate detector module in Embodiment 3 has low computational complexity. This scheme only needs to calculate the similarity scores between the anchor word and the top-K boundary words selected by the local sensitive hashing technology, and the computational complexity is O(N log(K)), in general, K<<N.

It should be noted that the entity recognition scheme provided in the present disclosure may be well adapted to the recognition of nested entities, and may also be applied to the recognition of traditional non-nested entities. This scheme may be applied to the following application scenarios that require nested entity recognition:

1. Smart Screen

Figure 18A:
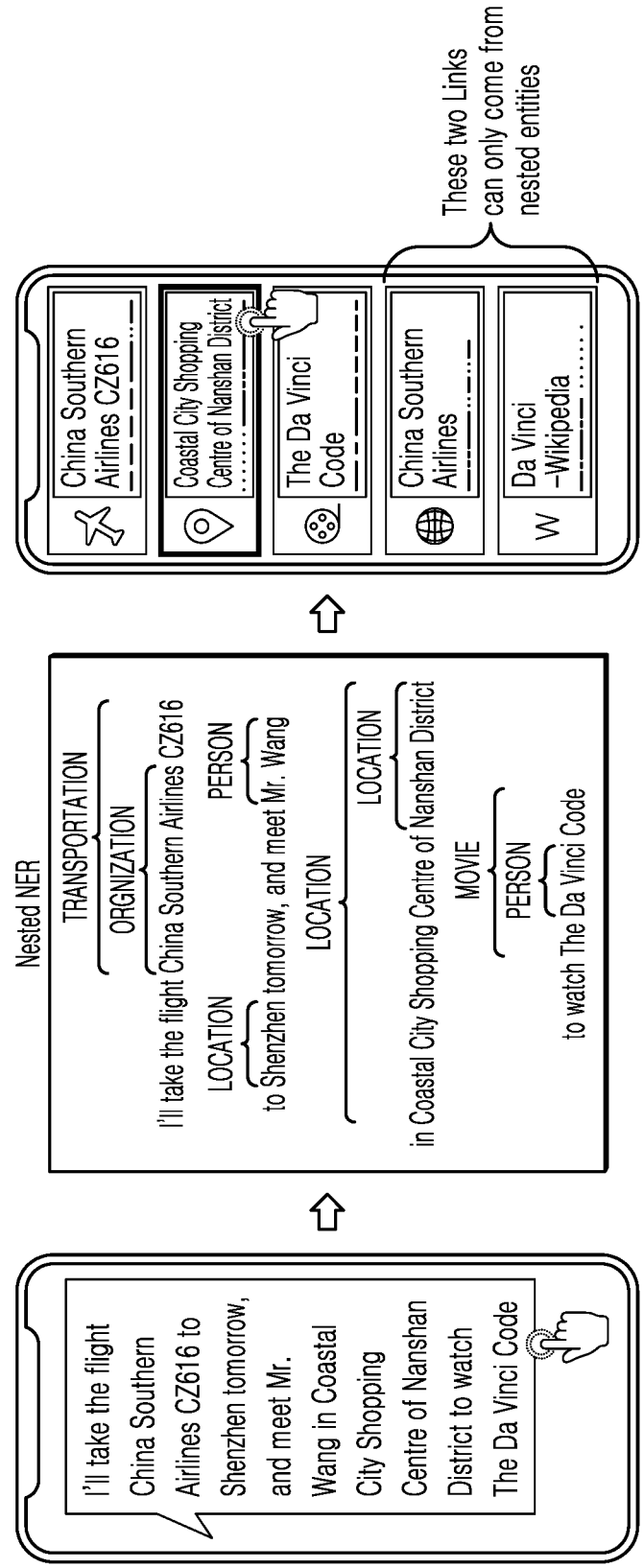
FIG. 18A is a schematic diagram of applying nested entity recognition in a smart screen according to an embodiment of the present disclosure.

The smart screen is an intelligent solution for mobile phones. When users are chatting, reading, or browsing pictures, the users may trigger the corresponding function by pressing and holding the text content region of the screen with their hands. It may automatically extract the entities and keys in the text, such as person names, place names, locations, phone numbers, etc., and then information expansion, application service links or interest recommendations are carried out on them to help users achieve the purpose of "One Step". FIG. 18A illustrates a potential example of applying nested entity recognition in smart screen according to an embodiment.

2. Reading Enhancement for News Reading

Figure 18B:
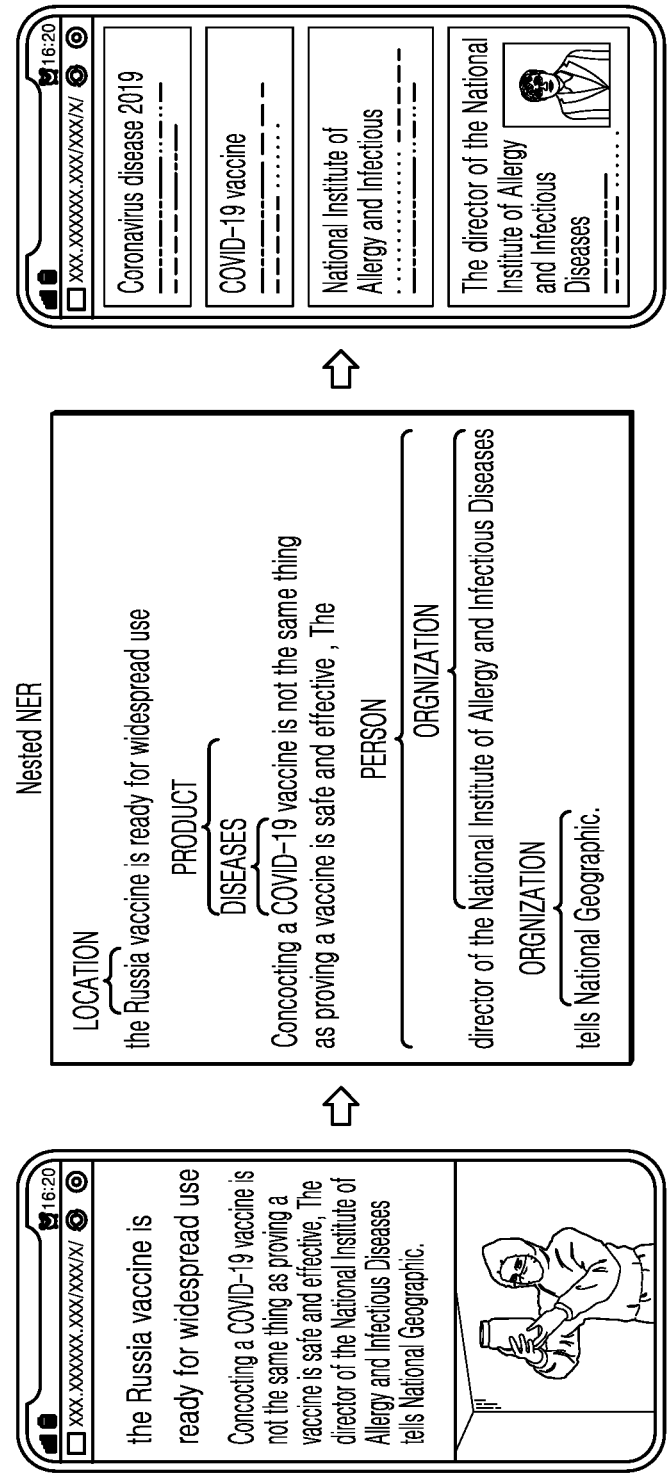
FIG. 18B is a schematic diagram of applying nested entity recognition in news reading enhancement according to an embodiment of the present disclosure.

When users read the news text, the users may be unfamiliar with the context information of related entities mentioned in the news. At this time, the reading enhancement function may automatically extract related entities from the text and link the extracted entities to related entity introduction webpages. This function may help users quickly jumps to the interest entity webpage, as shown in FIG. 18B, which illustrates an example of applying nested entity recognition in news reading enhancement according to an embodiment of the present disclosure.

3. Reading Enhancement for Menu

Figure 18C:
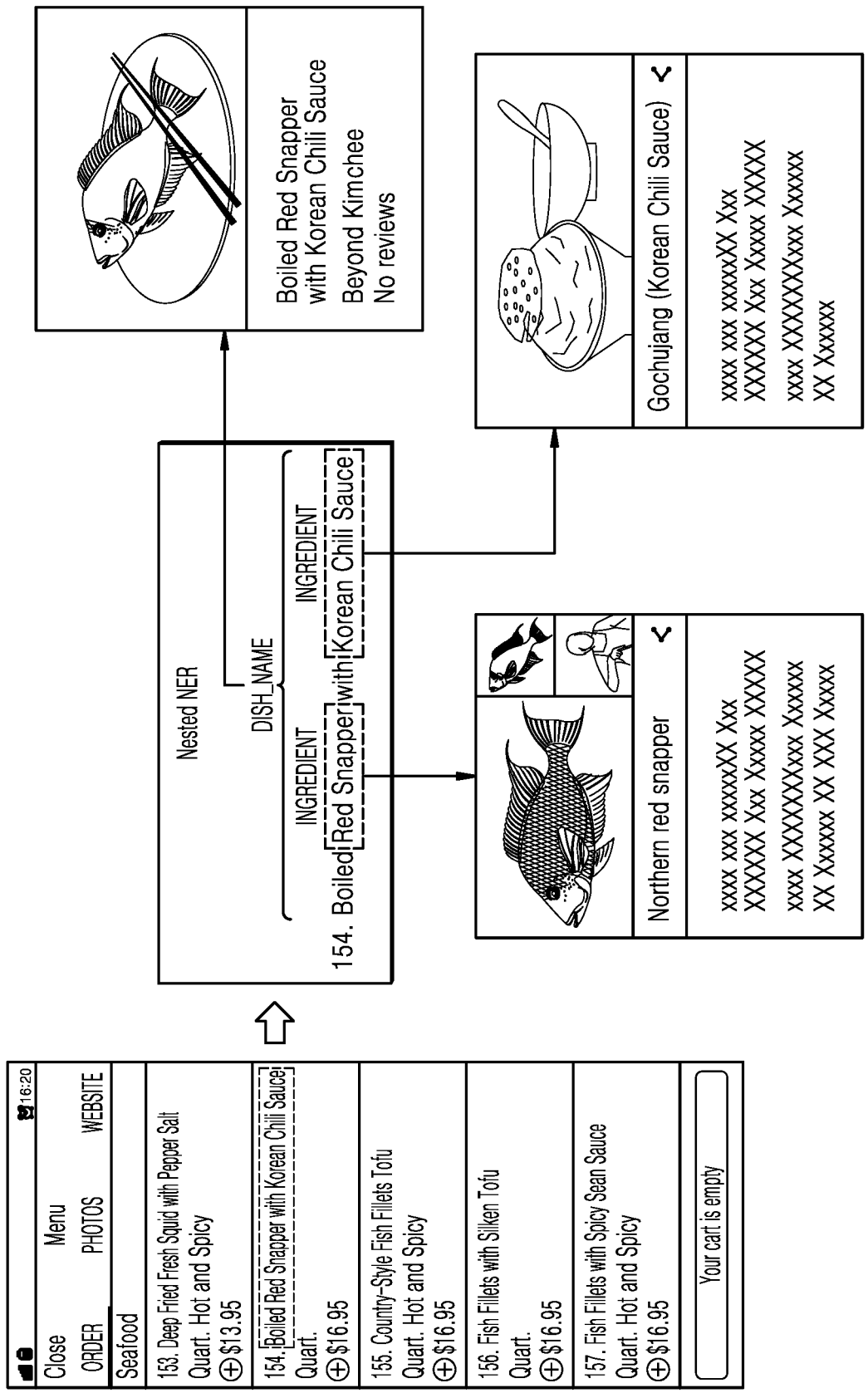
FIG. 18C is a schematic diagram of applying nested entity recognition in menu reading enhancement according to an embodiment of the present disclosure.

Customers may read the menu and order dishes based on understanding the name of the dishes in the menu, such as understanding and imagining the ingredients and dishes corresponding to the name of the dishes. However, the customer may encounter uneaten or unfamiliar ingredients from the menu. At this time, reading enhancement tools may be used to identify the ingredients in the dishes name (i.e., nested entities), and link to related real products and ingredient introductions for helping us understand, as shown in FIG. 18C, which illustrates an example of applying nested entity recognition in menu reading enhancement according to an embodiment of the present disclosure.

4. Image Tagging

Figure 18D:
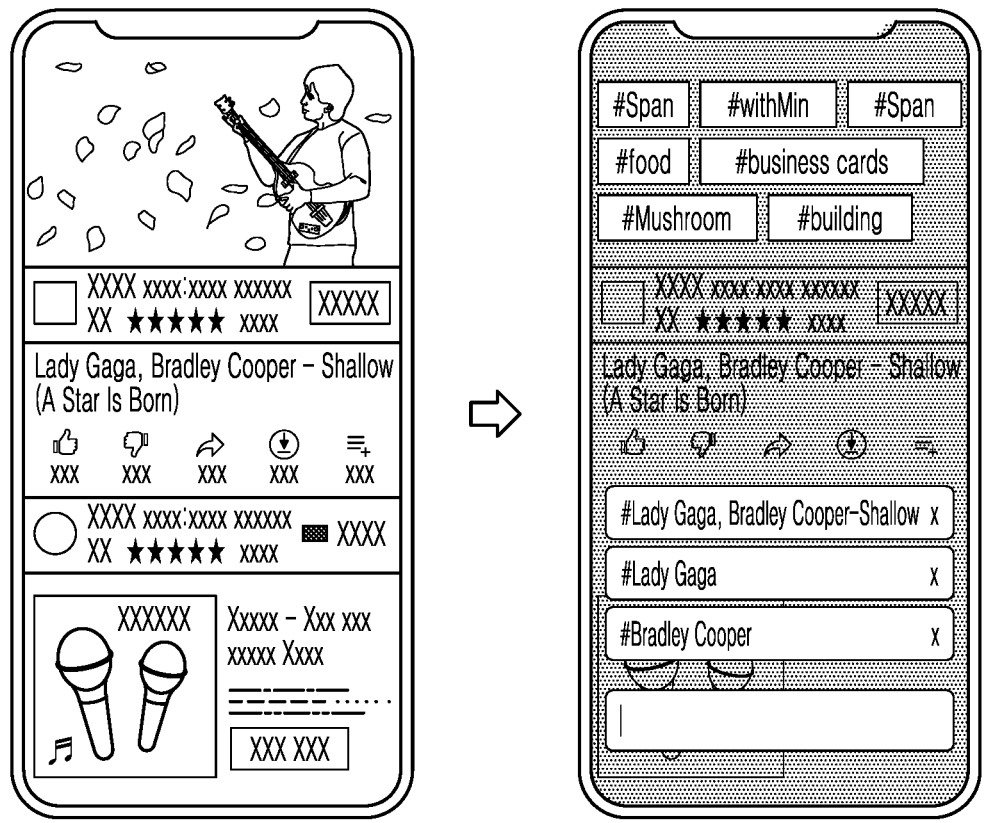
FIG. 18D is a schematic diagram of applying nested entity recognition in image editing according to an embodiment of the present disclosure.

Image tagging is a tool that may help users quickly edit image tags. Similar functions have been applied in many smart phones. When users intend to add tags to images and screenshots, the tool may automatically extract some key phrases from the text content in the images and provide them to users as candidates for selection and editing. FIG. 18D is a schematic diagram of applying nested entity recognition in image editing according to an embodiment of the present disclosure. As shown in FIG. 18D, the nested entity recognition technology provided by the present disclosure may be used to automatically extract these key phrases with different granularities from the text content, which only need to add an entity importance ranking.

5. Construction of Knowledge Graph

Figure 18E:
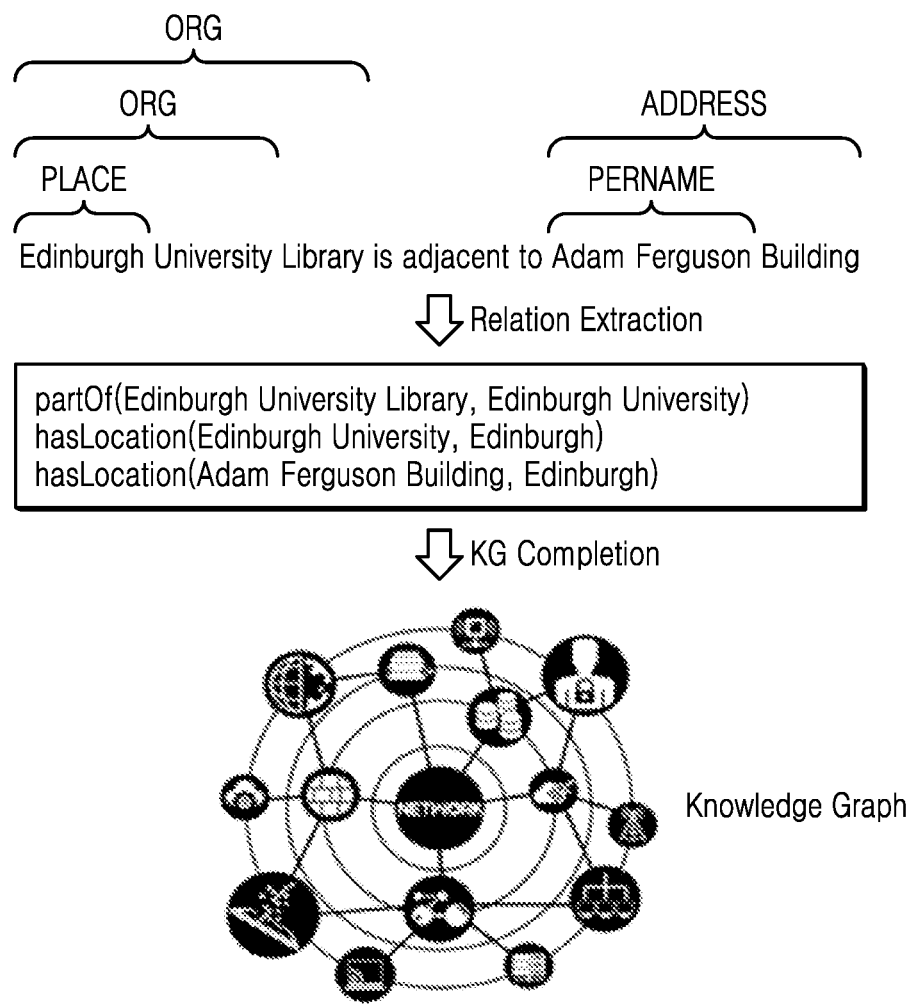
FIG. 18E is a schematic diagram of applying nested entity recognition in knowledge graph construction according to an embodiment of the present disclosure.

Knowledge graph is a kind of widely used in question answering system, recommendation system, search engine and other fields. This is particularly important for automatically constructing large-scale and complete knowledge graphs. Nested entity recognition may provide richer entity relationships for knowledge graph completion tasks. FIG. 18E is a schematic diagram of applying nested entity recognition in knowledge graph construction according to an embodiment of the present disclosure. For example, in FIG. 18E, firstly, based on the results of the nested entity recognition in the sentence, relation extraction is performed on the sentence to obtain the relationship between the entities in the sentence. Then, the knowledge graph (KG completion) is constructed based on the previous step, and finally the knowledge graph (KG) is obtained.

If the nested entity is not found, the related entity relationship may be lost, such as: hasLocation(Adam Ferguson Building, Edinburgh);

If these nested entities are found, the disclosure may obtain more additional entities, such as: partOf(Edinburgh University Library, Edinburgh University); hasLocation(Edinburgh University, Edinburgh).

Figure 19:
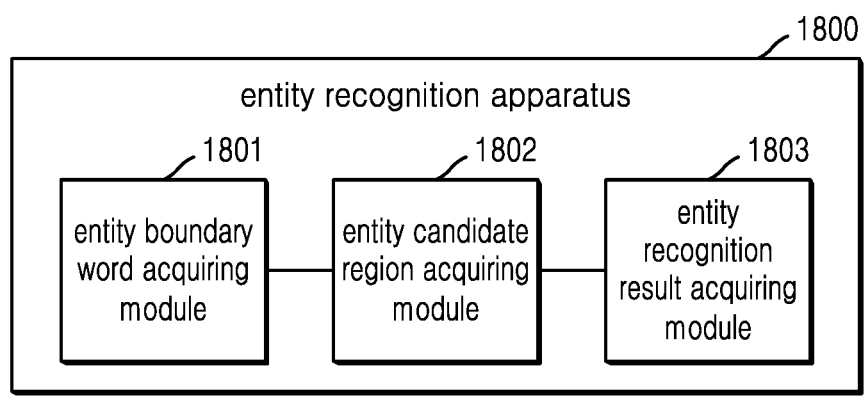
FIG. 19 is a structural block diagram of an entity recognition apparatus according to an embodiment of the present disclosure.

FIG. 19 is a structural block diagram of an entity recognition apparatus 1800 provided by an embodiment of the present disclosure. As shown in FIG. 19, the apparatus 1800 may include: an entity boundary word acquiring module 1801, an entity candidate region acquiring module 1802, and an entity recognition result acquiring module 1803. The entity boundary word acquiring module 1801 is configured to acquire at least one entity boundary word corresponding to a text sequence to be recognized. The entity candidate region acquiring module 1802 is configured to acquire at least one entity candidate region in the text sequence to be recognized based on the at least one entity boundary word. The entity recognition result acquiring module 1803 is configured to acquire entity recognition result for the text sequence to be recognized based on the at least one entity candidate region.

The solution provided by the embodiments of the present disclosure may increase a rate of an entity candidate region covering entities in the text sequence to be recognized, without increasing the number of entity candidate regions, thereby decreasing complexity for calculation.

In an embodiment of the present disclosure, the entity boundary word acquiring module is configured to: use all words in the text sequence to be recognized, as entity boundary words; or based on a context representation vector of the word in the text sequence to be recognized, acquire a probability of the word in the text sequence to be recognized being used as the entity boundary word, and based on the probability, determining the entity boundary word of the text sequence to be recognized.

In an embodiment of the present disclosure, the entity candidate region acquiring module is configured to: acquire an entity proposal region corresponding to the text sequence to be recognized based on the entity boundary word; and acquire corresponding entity candidate region based on the entity proposal region.

In an embodiment of the present disclosure, the entity candidate region acquiring module is further configured to: based on at least one preset width, using the entity boundary word respectively as an anchor word to acquire corresponding entity proposal region having at least one preset width.

In an embodiment of the present disclosure, the entity candidate region acquiring module is further configured to: acquire a corresponding combination vector based on the context representation vector of a word covered by the entity proposal region and a context representation vector of the corresponding anchor word; acquire similarity between the context representation vector of the entity boundary word in the text sequence to be recognized and the corresponding combination vector; and acquire the corresponding entity candidate region based on the similarity.

In an embodiment of the present disclosure, the entity candidate region acquiring module is further configured to: acquire similarity between the context representation vector of the entity boundary word in the text sequence to be recognized and the corresponding combination vector in Euclidean space or hyperbolic space.

In an embodiment of the present disclosure, the entity candidate region acquiring module is further configured to: based on the similarity, determine a start boundary word of the corresponding entity candidate region from among the anchor word of the entity proposal region in the text sequence to be recognized and the entity boundary word located on the left side of the anchor word, and determine an end boundary word of the corresponding entity candidate region from among the anchor word of the entity proposal region in the text sequence to be recognized and the entity boundary word located on the right side of the anchor word; and determine the corresponding entity candidate region based on the start boundary word and the end boundary word.

In an embodiment of the present disclosure, the entity candidate region acquiring module is further configured to: obtain a corresponding feature vector, by setting a width of the entity proposal region as a convolution kernel width and performing convolution processing on the context representation vector for the word covered by the entity proposal region; and acquire the corresponding combination vector based on a feature vector corresponding to a word covered by the entity proposal region and a context representation vector of the corresponding anchor word.

In an embodiment of the present disclosure, the entity candidate region acquiring module is further configured to: determine at least one start boundary word candidate and at least one end boundary word candidate for the anchor word of the entity proposal region; determine the start boundary word of the entity proposal region from among the at least one start boundary word candidate, and the end boundary word of the entity proposal region from among the at least one end boundary word candidate; and determine the corresponding entity candidate region based on the obtained start boundary word and end boundary word.

In an embodiment of the present disclosure, the entity candidate region acquiring module is further configured to: determine the anchor word of the entity proposal region and the boundary word located on the left side of the anchor word as the at least one start boundary word candidate for the anchor word; and determine the anchor word of the entity proposal region and the boundary word located on the right side of the anchor word as the at least one end boundary word candidate for the anchor word.

In an embodiment of the present disclosure, the entity candidate region acquiring module is further configured to: determine a first probability of each of the at least one start boundary word candidate being the start boundary word of the entity proposal region, and a second probability of each of the at least one end boundary word candidate being the end boundary word of the entity proposal region; and determine the start boundary word of the entity proposal region based on the first probability, and the end boundary word of the entity proposal region based on the second probability.

In an embodiment of the present disclosure, the entity recognition result acquiring module is configured to: filter the at least one entity candidate region to obtain at least one filtered entity candidate region; and classify category of each of the at least one filtered entity candidate region to obtain the entity recognition result for the text sequence to be recognized.

In an embodiment of the present disclosure, the entity recognition result acquiring module is further configured to: acquire a corresponding first classification feature vector based on the context representation vector for the word covered by the entity candidate region; acquire a probability of the entity candidate region belonging to an entity based on the first classification feature vector corresponding to the entity candidate region; and acquire the filtered entity candidate region based on the probability of the entity candidate region belonging to the entity.

In an embodiment of the present disclosure, the entity recognition result acquiring module is further configured to: acquire a corresponding second classification feature vector based on the context representation vectors for the start boundary word and the end boundary word corresponding to each of the at least one filtered entity candidate region; and classify category of each of the at least one filtered entity candidate region based on the second classification feature vector to obtain the entity recognition result for the text sequence to be recognized.

In an embodiment of the present disclosure, the entity recognition result acquiring module is configured to: acquire a corresponding third classification feature vector based on the context representation vectors for the start boundary word and the end boundary word corresponding to the at least one entity candidate region; and classify category of the at least one entity candidate region based on the third classification feature vector to obtain the entity recognition result for the text sequence to be recognized.

In an embodiment of the present disclosure, the entity candidate region acquiring module is configured to: acquire a preset number of entity boundary words adjacent to the at least one entity boundary word from the text sequence to be recognized; acquire the similarity between the context representation vector of the entity boundary word and the context representation vectors of the corresponding adjacent preset number of entity boundary words, respectively; and acquire the corresponding entity candidate region based on the similarity.

In an embodiment of the present disclosure, the entity candidate region acquiring module is further configured to: based on the similarity, determine respectively the start boundary word and the end boundary word of the corresponding entity candidate region from the entity boundary word of the text sequence to be recognized and the preset number of entity boundary words adjacent to the entity boundary word; and determine the corresponding entity candidate region based on the start boundary word and the end boundary word.

Based on the same principle, the embodiment of the disclosure also provides an electronic device, which includes a memory, a processor and computer programs stored on the memory and capable of being executed by the processor, that implements, when executed by the processor the method provided by any of embodiments of the present disclosure, which may include the following: acquiring at least one entity boundary word corresponding to a text sequence to be recognized; acquiring at least one entity candidate region in the text sequence to be recognized based on the at least one entity boundary word; and acquiring entity recognition result for the text sequence to be recognized based on the at least one entity candidate region.

An embodiment of the present disclosure provides a computer-readable storage medium, and a computer program is stored thereon for implementing when the computer program is executed by a processor, the method provided by any of embodiments of the present disclosure.

Figure 20:
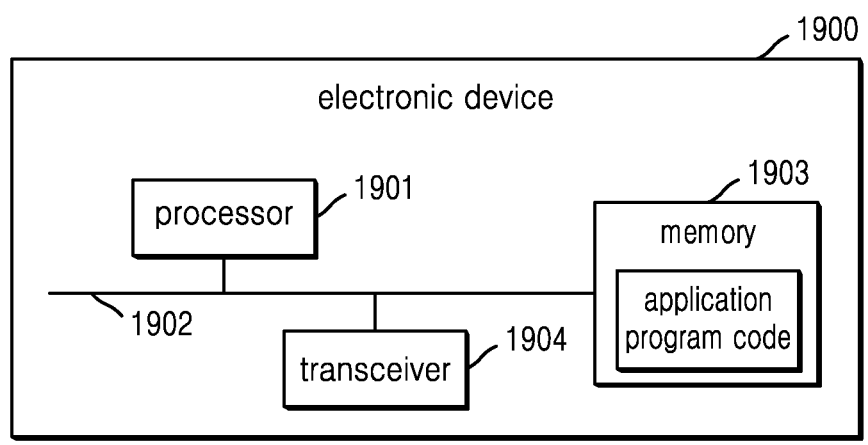
FIG. 20 is a schematic structural diagram of an electronic device according to an embodiment of the disclosure.

FIG. 20 illustrates a schematic structural diagram of an electronic device 1900 suitable for the embodiment of the present disclosure. As shown in FIG. 20, the electronic device 1900 illustrated in FIG. 20 includes a processor 1901 and a memory 1903. The processor 1901 and the memory 1903 are connected, for example, via a bus 1902. Further, the electronic device 1900 may further include a transceiver 1904, and the electronic device 1900 may communicate data with other electronic devices through the transceiver 1904. It should be noted that the transceiver 1904 is not limited to one in actual disclosure, and the structure of the electronic device 1900 is not limited to the embodiment of the present disclosure.

The processor 1901 being applied for embodiments of the present disclosure, may be used to implement the function of the entity recognition apparatus shown in FIG. 19.

The processor 1901 may be a CPU, a general-purpose processor, a DSP, an ASIC, an FPGA, or other programmable logic devices, transistor logic devices, hardware components, or any combination thereof. Various exemplary logic blocks, modules, and circuits described in connection with the present disclosure may be implemented or executed. The processor 1901 may also be a combination that implements computing functions, such as a combination that includes one or more microprocessors, a combination of DSP and microprocessors, etc.

The bus 1902 may include a path to transfer information between the above components. The bus 1902 may be a PCI bus, an EISA bus, or the like. The bus 1902 may be divided into an address bus, a data bus, a control bus, etc. For ease of representation, the bus is expressed by only one thick line in FIG. 20, but it does not mean only one bus or one type of bus.

The memory 1903 may be a ROM or other types of static storage device that may store static information and instructions, a RAM or other types of dynamic storage device that may store information and instructions. It may also be an EEPROM, a CD-ROM or other optical disc storage, disc storage (including compact disc, laser disc, optical disc, digital versatile disc, Blu-ray disc, etc.), magnetic disc storage medium or other magnetic storage device, or any other medium capable of carrying or storing desired program code in the form of instructions or data structures and capable of being accessed by a computer, but is not limited thereto.

The memory 1903 is configured to store application program codes for executing the solution of the present disclosure, and the execution is controlled by the processor 1901. The processor 1901 is configured to execute application program codes stored in the memory 1903 to implement the actions of the entity recognition apparatus provided in the embodiment shown in FIG. 19.

The beneficial technical effects provided by the technical solutions provided in the disclosure are set forth as follow: through acquiring an entity candidate region corresponding to the text sequence to be recognized, and then acquiring entity recognition result for the text sequence to be recognized based on the entity candidate region; the scheme may increase a rate of an entity candidate region covering entities in the text sequence to be recognized, without increasing the number of entity candidate regions, thereby decreasing complexity for calculation.

The apparatus provided in the embodiment of the present disclosure may implement at least one of the multiple modules through an AI model. The functions associated with AI may be performed through non-volatile memory, volatile memory, and a processor.

The processor may include one or more processors. At this time, the one or more processors may be general-purpose processors, such as a central processing unit (CPU), an application processor (AP), etc., or a pure graphics processing unit, such as a graphics processing unit (GPU), visual processing unit (VPU), and/or AI dedicated processor, such as neural processing unit (NPU).

The one or more processors control the processing of input data based on predefined operating rules or artificial intelligence (AI) models stored in non-volatile memory and volatile memory. Pre-defined operating rules or artificial intelligence models are provided by training or learning.

Here, providing by learning refers to obtaining a predefined operation rule or an AI model with desired characteristics by applying a learning algorithm to a plurality of learning data. This learning may be performed in the AI apparatus itself according to embodiments and/or may be implemented by a separate server/system.

The AI model may contain multiple neural network layers. Each layer has multiple weight values, and the calculation of one layer is performed by the calculation result of the previous layer and multiple weights of the current layer. Examples of neural networks include, but are not limited to, convolutional neural networks (CNN), deep neural networks (DNN), recurrent neural networks (RNN), restricted Boltzmann machines (RBM), deep belief networks (DBN), bidirectional loops Deep Neural Network (BRDNN), Generative Adversarial Network (GAN), and Deep Q Network.

The learning algorithm is a method of training a predetermined target device (for example, a robot) using a plurality of learning data to make, allow, or control the target device to make determination or prediction. Examples of the learning algorithm include, but are not limited to, supervised learning, unsupervised learning, semi-supervised learning, or reinforcement learning.

Those skilled in the art would clearly understand that for the convenience and conciseness of the description, the method implemented when the computer-readable medium described above is executed by the electronic device may refer to the corresponding process in the foregoing method embodiment, which will not be repeated here.

It should be understood that although various steps in the flowchart of the drawings are shown in sequence as indicated by arrows, these steps are not necessarily executed in sequence as indicated by arrows. Unless explicitly stated herein, the execution of these steps is not strictly limited in sequence but may be performed in other sequences. Moreover, at least a part of the steps in the flowchart of the drawings may include a plurality of sub-steps or stages, which are not necessarily completed at the same time, but may be executed at different times, and the execution order thereof is not necessarily sequentially, but may be executed in turn or alternately with at least a part of the sub-steps or stages of other steps or other steps.

The foregoing is only a partial embodiment of the present disclosure, and it should be noted that several modifications and refinements may be made to one of ordinary skill in the art without departing from the principles of the present disclosure, these improvements and finishes should also be considered to be within the scope of the present disclosure.

What is claimed is:

1. An entity recognition method performed by an entity recognition apparatus, the method comprising:
   determining at least one entity boundary word corresponding to a text sequence, determining, by using a respective entity boundary word of the at least one entity boundary word as an anchor word, an entity proposal region corresponding to the text sequence based on the at least one entity boundary word;
   adjusting boundaries of the entity proposal region based on an association relationship between the entity proposal region and each word in the text sequence to be recognized;
   determining at least one entity candidate region in the text sequence based on the adjusted boundaries of the entity proposal region; and
   performing entity recognition on the text sequence and identifying at least one entity in the text sequence based on the at least one entity candidate region.

2. The method of claim 1, wherein the determining the at least one entity boundary word comprises:
   based on a context representation vector of a word in the text sequence, determining a probability of the word in the text sequence being used as an entity boundary word, and based on the probability, determining the entity boundary word of the text sequence.

3. The method of claim 1, wherein the determining the entity proposal region comprises:
   determining the entity proposal region to have at least one preset width, with respect to the anchor word.

4. The method of claim 3, wherein the adjusting the boundaries of the entity proposal region comprises:
   determining a corresponding combination vector based on a context representation vector of a word covered by the entity proposal region and a context representation vector of a corresponding anchor word;
   determining a similarity between a context representation vector of the entity boundary word in the text sequence and the corresponding combination vector; and
   adjusting the boundaries of the entity proposal region based on the similarity, and
   wherein the method further comprises:
   determining a corresponding entity candidate region of which a start boundary word and an end boundary word are determined based on the adjusted boundaries of the entity proposal region.

5. The method of claim 4, wherein the determining the corresponding entity candidate region based on the similarity comprises:
   based on the similarity, determining the start boundary word of the corresponding entity candidate region from among at least one anchor word of the entity proposal region in the text sequence and an entity boundary word located on a left side of the anchor word, and determining the end boundary word of the corresponding entity candidate region from among the at least one anchor word of the entity proposal region in the text sequence and an entity boundary word located on a right side of the anchor word, and
   determining the corresponding entity candidate region based on the start boundary word and the end boundary word.

6. The method of claim 4, wherein the determining the corresponding combination vector comprises:
   obtaining a corresponding feature vector, by setting a width of the entity proposal region as a convolution kernel width and performing a convolution processing on the context representation vector of the word covered by the entity proposal region; and
   determining the corresponding combination vector based on the corresponding feature vector for the word covered by the entity proposal region and the context representation vector of the corresponding anchor word.

7. The method of claim 3, wherein the adjusting the boundaries of the entity proposal region comprises:
   determining at least one start boundary word candidate and at least one end boundary word candidate for the anchor word of the entity proposal region; and
   determining a start boundary word of the entity proposal region from among the at least one start boundary word candidate, and determining an end boundary word of the entity proposal region from among the at least one end boundary word candidate, and
   wherein the method further comprises:
   determining a corresponding entity candidate region based on the start boundary word and the end boundary word.

8. The method of claim 7, wherein the determining the at least one start boundary word candidate and the at least one end boundary word candidate comprises:
   determining the anchor word of the entity proposal region and an entity boundary word located on a left side of the anchor word as the at least one start boundary word candidate for the anchor word; and
   determining the anchor word of the entity proposal region and an entity boundary word located on a right side of the anchor word as the at least one end boundary word candidate for the anchor word.

9. The method of claim 7, wherein the determining the start boundary word and the determining the end boundary word comprise:
   determining a first probability of each of the at least one start boundary word candidate being the start boundary word of the entity proposal region, and a second probability of each of the at least one end boundary word candidate being the end boundary word of the entity proposal region; and
   determining the start boundary word of the entity proposal region based on the first probability, and determining the end boundary word of the entity proposal region based on the second probability.

10. The method of claim 1, wherein the performing the entity recognition comprises:
    filtering the at least one entity candidate region to obtain at least one filtered entity candidate region; and
    classifying a category of each of the at least one filtered entity candidate region to obtain a result of the entity recognition for the text sequence,
    wherein the filtering the at least one entity candidate region comprises:
    determining a corresponding first classification feature vector based on a context representation vector for a word covered by an entity candidate region;
    determining a probability of the entity candidate region belonging to an entity based on the corresponding first classification feature vector; and
    obtaining a filtered entity candidate region based on the probability of the entity candidate region belonging to the entity.

11. The method of claim 10, wherein the classifying the category of each of the at least one filtered entity candidate region comprises:

determining a corresponding second classification feature vector based on context representation vectors for a start boundary word and an end boundary word corresponding to each of the at least one filtered entity candidate region; and classifying the category of each of the at least one filtered entity candidate region based on the corresponding second classification feature vector to obtain the result of the entity recognition for the text sequence.

12. The method of claim 1, wherein the performing the entity recognition comprises:

determining a corresponding third classification feature vector based on context representation vectors for a start boundary word and an end boundary word corresponding to the at least one entity candidate region; and classifying a category of the at least one entity candidate region based on the third classification feature vector to obtain a result of the entity recognition for the text sequence.

13. The method of claim 1, wherein the determining the at least one entity candidate region comprises:

determining a preset number of entity boundary words adjacent to the at least one entity boundary word from the text sequence;

determining a similarity between a context representation vector of an entity boundary word and each of context representation vectors of the preset number of entity boundary words adjacent to the entity boundary word; and determining a corresponding entity candidate region based on the similarity.

14. An entity recognition apparatus, comprising:

at least one memory configured to store program code; and at least one processor configured to read the program code and operate as instructed by the program code, the program code comprising:

entity boundary word determining code configured to cause the at least one processor to determine at least one entity boundary word corresponding to a text sequence;

entity proposal region determining code configured to cause the at least one processor to determine, by using a respective entity boundary word of the at least one entity boundary word as an anchor word, an entity proposal region corresponding to the text sequence based on the at least one entity boundary word;

boundaries adjusting code configured to cause the at least one processor to adjust boundaries of the entity proposal region based on an association relationship between the entity proposal region and each word in the text sequence to be recognized;

entity candidate region determining code configured to cause the at least one processor to determine at least one entity candidate region in the text sequence based on the adjusted boundaries of the entity proposal region; and entity recognition code configured to cause the at least one processor to perform entity recognition on the text sequence and identifying at least one entity in the text sequence based on the at least one entity candidate region.

* * * * *